United States Patent
Nagaraja et al.

(10) Patent No.: US 9,210,023 B1
(45) Date of Patent: Dec. 8, 2015

(54) METHOD AND SYSTEM OF RANGING AND SUBCARRIER ALLOCATION IN ORTHOGONAL FREQUENCY DIVISION MULTIPLE ACCESS SYSTEM

(71) Applicant: Saankhya Labs Pvt. Ltd, Bengaluru (IN)

(72) Inventors: Srinidhi Nagaraja, Davangere (IN); Shrinivas Subramania Bhat, Bengaluru (IN)

(*) Notice: Subject to any disclaimer, the term of this patent is extended or adjusted under 35 U.S.C. 154(b) by 0 days.

(21) Appl. No.: 14/733,491

(22) Filed: Jun. 8, 2015

(30) Foreign Application Priority Data

Apr. 17, 2015 (IN) .......................... 2001/CHE/2015

(51) Int. Cl.
*H04L 27/00* (2006.01)
*H04L 27/26* (2006.01)
*H04L 5/00* (2006.01)

(52) U.S. Cl.
CPC ............ *H04L 27/265* (2013.01); *H04L 5/0098* (2013.01)

(58) Field of Classification Search
CPC ............ H04L 27/2647; H04L 25/0202; H04L 5/0048; H04L 2025/03414; H04L 27/2649; H04L 27/265; H04L 27/0098
USPC ........................................ 375/260, 316, 343
See application file for complete search history.

(56) References Cited

U.S. PATENT DOCUMENTS

| | | | | | |
|---|---|---|---|---|---|
| 7,136,111 | B2* | 11/2006 | Kim | ....................... | H04N 5/211 348/607 |
| 7,298,785 | B2* | 11/2007 | Suzuki | .................. | H04L 27/265 375/260 |
| 7,486,735 | B2* | 2/2009 | Dubuc | ................ | H04L 27/2608 370/206 |
| 7,515,641 | B2* | 4/2009 | Yu | .......................... | H04L 5/023 375/222 |
| 7,702,037 | B2* | 4/2010 | Driesen | ................. | H04L 25/061 375/319 |
| 8,107,428 | B2* | 1/2012 | Chong | .................. | H04J 3/0682 370/203 |
| 8,774,295 | B2* | 7/2014 | Okehie | ................ | H04L 25/022 375/260 |
| 8,787,216 | B2* | 7/2014 | Yoon | ..................... | H04L 5/0007 370/203 |
| 2015/0163517 | A1* | 6/2015 | Mun | ....................... | H04L 29/00 375/240.27 |

* cited by examiner

*Primary Examiner* — Emmanuel Bayard
(74) *Attorney, Agent, or Firm* — The Law Office of Austin Bonderer, PC; Austin Bonderer

(57) ABSTRACT

A method of ranging and sub-carrier selection in an orthogonal frequency division multiple access (OFDMA) system and the OFDMA system is disclosed. An OFDM symbol is received from a customer premises equipment (CPE) at a base station. The OFDM symbol is demodulated for obtaining a plurality of subcarriers. A plurality of data subcarriers are multiplied by zeros and stored. A plurality of uniformly spaced subcarriers is extracted from the stored subcarriers. A ranging CPE is detected in uniformly spaced subcarriers. Delay estimation is performed using the stored plurality of subcarriers upon detecting presence of ranging CPE. A method of subcarrier allocation at a ranging CPE transmitter based on total number of subcarriers, subcarriers in used band, a delay spread to be supported in terms of number of samples, a required ratio of highest amplitude to second highest amplitude of the ranging signal is disclosed.

25 Claims, 14 Drawing Sheets

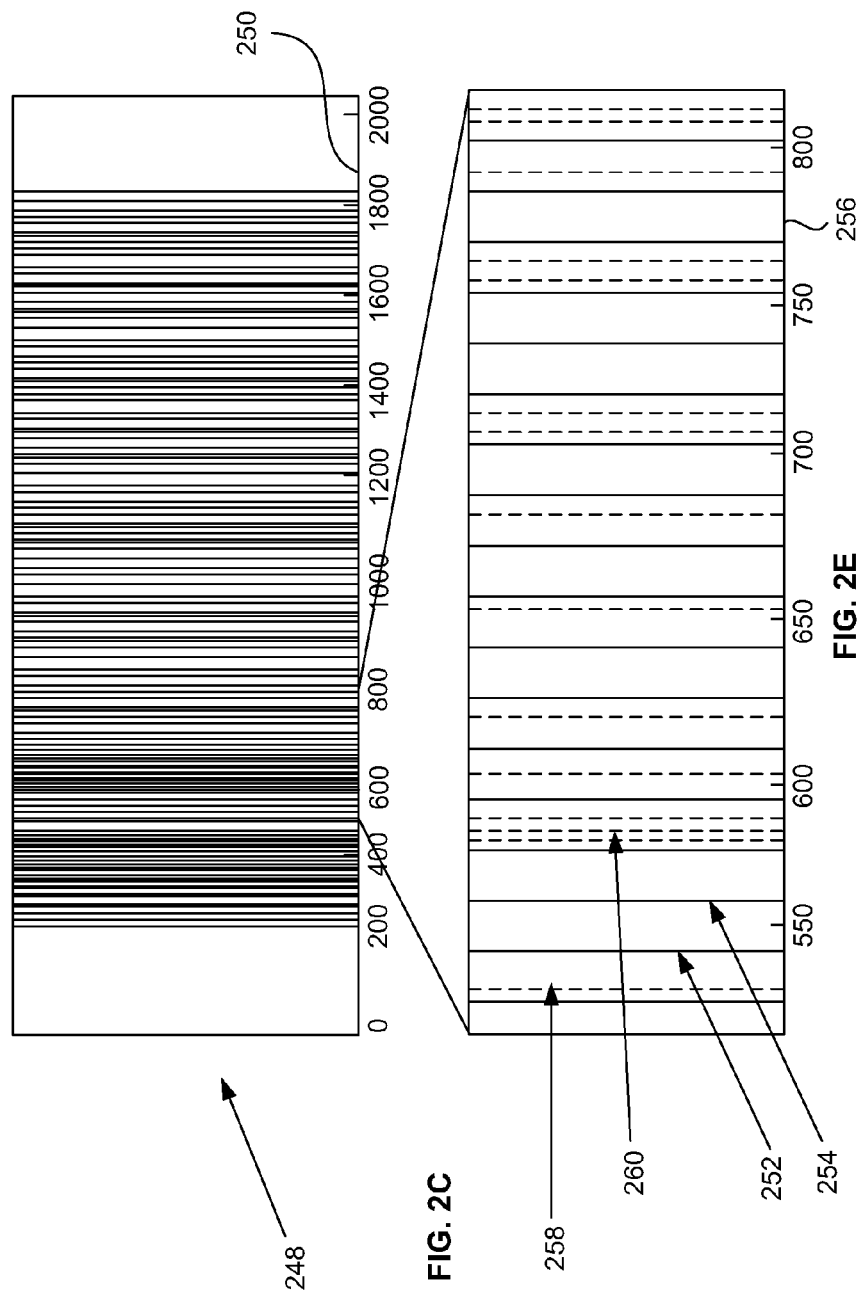

METHOD AND SYSTEM OF RANGING AND SUBCARRIER ALLOCATION IN ORTHOGONAL FREQUENCY DIVISION MULTIPLE ACCESS SYSTEM

CROSS REFERENCE TO RELATED APPLICATIONS

This application claims priority to and the benefit of the non-provisional patent application number 2001/CHE/2015 titled "Method And System Of Ranging And Subcarrier Allocation In Orthogonal Frequency Division Multiple Access System" filed in the Indian Patent Office on Apr. 17, 2015. The specification of the above referenced patent application is incorporated herein by reference in its entirety.

BACKGROUND

1. Technical Field

The embodiments herein generally relate to communication networks, and more particularly, to ranging in communication systems.

2. Description of the Related Art

Ranging refers to a process of estimating and adjusting the delays, transmits power and frequency offsets of various customer premise equipment (CPEs) with respect to one or more references fixed at a base station (BS). The process of ranging is indispensable in systems using orthogonal frequency division multiple access (OFDMA) that require supporting CPEs that are positioned at large distances from the BS causing a delay larger than the delay corresponding to a cyclic prefix (CP) used. The process of ranging enables the BS to command a CPE to advance a timing boundary sufficiently so that a received frame boundary of the CPE approximately aligns with the frame boundary of other CPEs that are already linked to the BS. The process of ranging also enables power and frequency corrections to be applied to the CPEs so as to facilitate all the CPEs to appear co-located and synchronized.

In various communication standards, the process of ranging may be performed through an initial ranging and subsequently through periodic ranging. During the initial ranging, a CPE registers or re-registers with a BS. On successful completion of initial ranging, the CPE gets attached to the BS and subsequently correction and tracking of delay, power and/or frequency offset may be done through periodic ranging. The periodic ranging is done to periodically adjust various physical parameters of the CPE and to verify that the CPE is still communicatively coupled to the BS. In several exemplary scenarios initial ranging as well as periodic ranging processes may be initiated by the CPEs after the BS allots a ranging window on an uplink communication (from the CPE to the BS) that is exclusively for ranging purposes. A ranging window consists of a set of ranging subcarriers in a given set of orthogonal frequency division multiplexing (OFDM) symbols. The CPEs that need to range need to contend in the allotted ranging window. In some exemplary scenarios, in order to reduce chances of two or more CPEs ranging in a common ranging window, a random back-off algorithm may be employed.

The CPEs may also use random code division multiple access (CDMA) codes that may be used to separate ranging signals from different CPEs. Typically performance of ranging with respect to delay estimation and complexity depends on a pattern of selection of the ranging subcarriers. The ranging sub-carrier selection should preferably span the full bandwidth, should enable an unambiguous delay covering a maximum range possible, and should also enable a low complexity detection of a ranging code such as a CDMA code transmitted from a CPE to the BS. Typical ranging sub-carrier allocation techniques use randomly spaced ranging subcarriers (for example, in WiMAX standards), uniformly spaced ranging subcarriers (for example in IEEE 802.22 standards) for ranging, or allocation based on some permutation (like the output of an interleaver).

Ranging performed using uniformly spaced subcarriers imposes certain constraints on delay estimation that is performed using frequency domain correlation techniques. For instance, in IEEE 802.22 standard, a uniform spacing of 10 between the subcarriers is mentioned that causes a repetition of 10 peaks in an output of the frequency domain correlation process that leads to ambiguity in delay estimation. In randomly spaced subcarriers, the spacing between any two ranging subcarriers do not have uniformity (but are fixed once chosen). Ranging performed using randomly spaced subcarriers leads to higher complexity, as a frequency domain correlation involves multiplying received ranging subcarriers by the corresponding transmitted data on the subcarriers, and computing an inverse fast Fourier transform (IFFT). Additionally, in the case of randomly spaced subcarriers the IFFT length will be equal to the total number of subcarriers in the OFDM symbol since the relative positions of the ranging subcarriers cannot be altered. Moreover, allocation based on interleaving might not choose the spacing and number of uniformly spaced subcarriers optimally.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

Various methods and systems for ranging and sub-carrier allocation in an orthogonal frequency division multiple access (OFDMA) system are disclosed. In an embodiment, the method includes receiving an orthogonal frequency division multiplexing (OFDM) symbol from a customer premises equipment (CPE) associated with the OFDMA system by a receiver associated with a base station of the OFDMA system. The received OFDM symbol is demodulated by performing a fast Fourier transform (FFT) of the received OFDM symbol for obtaining a plurality of subcarriers. A plurality of data subcarriers from among the plurality of subcarriers are multiplied by zeros and the resultant plurality of subcarriers (comprising both ranging and data subcarriers) are stored. A plurality of uniformly spaced subcarriers with a predetermined spacing and starting from a predetermined subcarrier position are extracted from among the plurality of subcarriers such that, with the predetermined spacing and the predetermined starting subcarrier position the extracted uniformly spaced subcarriers include a predetermined number of (such as a maximum possible number of) ranging subcarriers. A presence or an absence of a ranging CPE from among the one or more ranging CPEs associated with the OFDMA system in the extracted uniformly spaced subcarriers is detected by performing a frequency domain correlation based on a ranging code associated with the ranging CPE. Delay estimation is performed using the stored subcarriers upon or subsequent to detecting presence of the ranging CPE on the extracted uniformly spaced subcarriers.

In another embodiment, a method of ranging in an OFDMA system that uses a band of 1680 subcarriers out of a total 2048 subcarriers is disclosed. The method includes receiving an OFDM symbol from a customer premises equipment (CPE) associated with the OFDMA system by a receiver associated with a base station of the OFDMA system and demodulating the received OFDM symbol by performing a fast Fourier transform (FFT) of the received OFDM symbol for obtaining a plurality of subcarriers. A plurality of data subcarriers from among the plurality of subcarriers are multiplied by zeros to obtain a plurality of resultant subcarriers (comprising one or more ranging subcarriers and/or one or more data subcarriers). The plurality of resultant subcarriers is stored for subsequent use. A predetermined number of uniformly spaced subcarriers with a predetermined spacing and starting from a predetermined subcarrier position are extracted from among the plurality of subcarriers. The predetermined spacing and the predetermined subcarrier position are selected such that, the extracted uniformly spaced subcarriers include a predetermined number of ranging subcarriers (such as for example a maximum possible number of ranging subcarriers). The predetermined number of uniformly spaced subcarriers is extracted such that the predetermined number of uniformly spaced subcarriers is uniformly spaced from one another by the predetermined spacing. In an embodiment, the predetermined number of uniformly spaced subcarriers is 128 and the predetermined spacing is 16. One of a presence or an absence of the ranging CPE from among the one or more ranging CPEs in the extracted uniformly spaced subcarriers is detected by performing a frequency domain correlation based on a ranging code associated with the ranging CPE. Delay estimation is performed using the stored plurality of resultant subcarriers upon or subsequent to detecting presence of the ranging CPE on the extracted uniformly spaced subcarriers.

In yet another embodiment, an OFDMA system is disclosed. The OFDMA system includes one or more customer premises equipments and one or more base stations communicatively associated with the one or more customer premises equipments. The base station includes at least one memory and at least one processor. The processor is configured to receive an OFDM symbol from a customer premises equipment (CPE) associated with the OFDMA system and demodulate the received OFDM symbol by performing a fast Fourier transform (FFT) of the received OFDM symbol for obtaining a plurality of subcarriers. Further the processor is also configured to multiply the plurality of data subcarriers from among the plurality of subcarriers by zeros for obtaining a plurality of resultant subcarriers and store the resultant plurality of subcarriers (comprising of both ranging and data subcarriers) for subsequent use. The processor is further configured to extract a plurality of uniformly spaced subcarriers with a predetermined spacing from among the plurality of subcarriers starting form a predetermined subcarrier position such that, with the predetermined spacing and the predetermined subcarrier position, a predetermined number of (such as maximum possible number of) ranging subcarriers are contained within the set of uniformly spaced subcarriers extracted. The processor is also configured to detect one of: a presence or an absence of a ranging CPE from among one or more ranging CPEs associated with the OFDMA system in the extracted uniformly spaced subcarriers, by performing a frequency domain correlation based on a ranging code associated with the ranging CPE and to perform a delay estimation using the stored subcarriers upon or subsequent to detecting presence of the ranging CPE on the extracted uniformly spaced subcarriers.

In yet another embodiment, a method of subcarrier allocation at a ranging CPE transmitter is disclosed. The method includes determining a total number of subcarriers, a number of subcarriers in a used band, a delay spread to be supported in terms of number of samples, a required ratio of highest amplitude to a second highest amplitude of the ranging signal in time domain (K). In an embodiment, a subcarrier spacing is selected based on a rounded value of ratio of the determined total number of subcarriers and the determined delay spread to be supported in terms of number of samples. The subcarrier spacing is selected based on one of a divisor of the total number of subcarriers nearest to the ratio or based on the ratio. A number of uniformly spaced subcarriers are selected to be one of i) an integer nearest to and less than a ratio of the number of used subcarriers and the selected spacing or ii) a prime number nearest to and less than the ratio of the number of used subcarriers and the selected spacing. In an embodiment, an offset of a first uniformly spaced subcarriers is selected from the first used subcarrier between 0 and remainder of division of the number of used subcarriers and the selected number of uniformly spaced subcarriers. A number of randomly spaced subcarriers equivalent to a rounded value of product of (K−1) and the selected number of uniformly spaced subcarriers is selected. The positions of the randomly spaced subcarriers are selected based on a pseudorandom sequence.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 2E illustrates selection of subcarriers in the OFDM system of FIG. 1A, in accordance with an embodiment;

DETAILED DESCRIPTION OF PREFERRED EMBODIMENTS

Figure 1A:
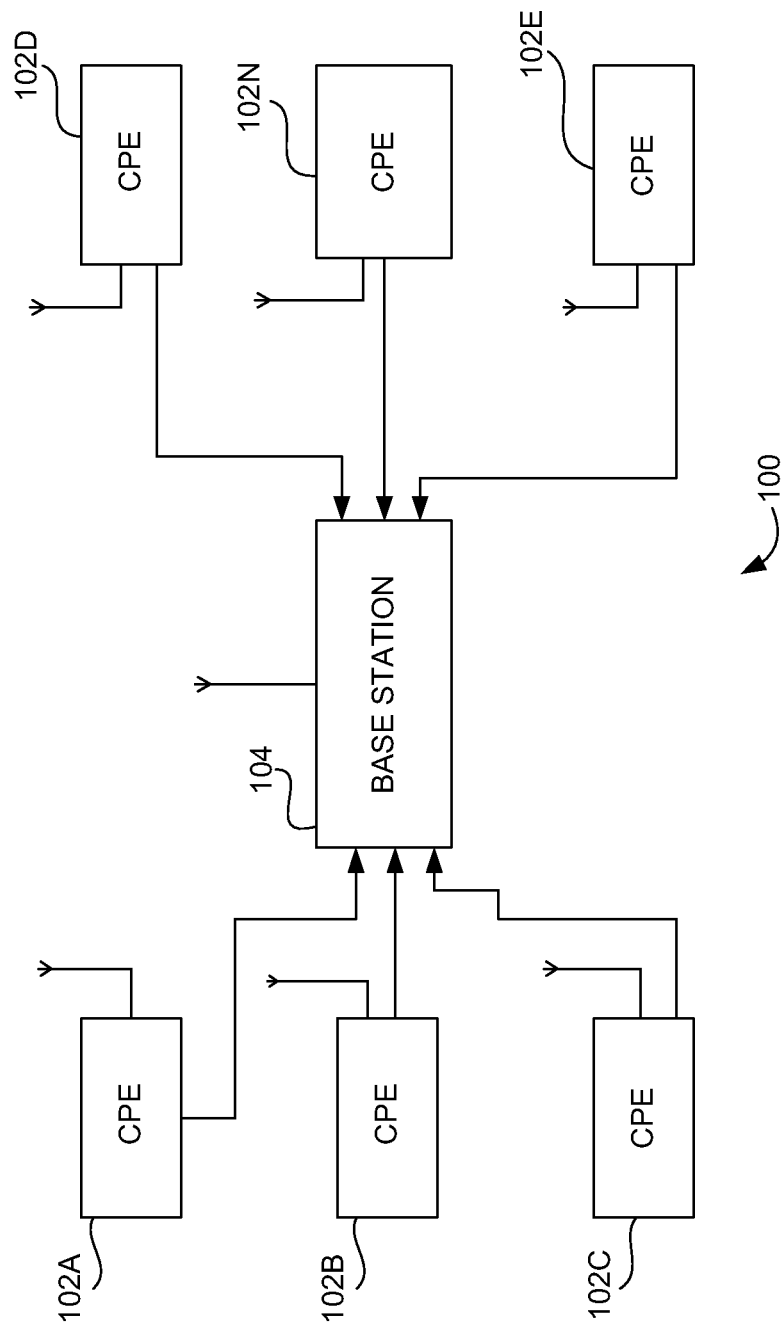
FIG. 1A depicts a block diagram representation of an orthogonal frequency division multiple access (OFDMA) system, in accordance with an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various methods and systems of the presented technology provide ranging in an orthogonal frequency division multiple access (OFDMA) system that involves detection of a ranging customer premises equipment on one or more uniformly spaced subcarriers and a delay estimation based on uniformly spaced subcarriers as well as one or more randomly spaced ranging subcarriers associated with an orthogonal frequency division multiplexing (OFDM) symbol received from one or more customer premises equipments, that together provide a unique and distinguishable peak of a frequency domain correlation output that corresponds to an actual delay so as to facilitate accurate delay estimation during ranging.

The methods and systems disclosed herein enable detection of ranging customer premises equipment to be performed using frequency domain correlation with small sized inverse fast Fourier transforms (IFFTs) and the delay estimation that requires large sized IFFT to be done only upon detection of the ranging customer premises equipment thereby reducing complexity of computation involved in the delay estimation. The uniformly spaced subcarriers enable low-complexity ranging CPE detection using frequency domain correlation, and the uniformly spaced subcarriers along with the randomly spaced ranging subcarriers give an unambiguous delay estimate. The detection as well as delay estimation steps may be performed based on frequency domain correlation. However, the IFFT used during detection may be of significantly smaller size than the total number of subcarriers in the OFDM symbols as only the uniformly spaced subcarriers may be used during detection. Consequently the complexity of the detection process is greatly reduced. During delay estimation, all the ranging subcarriers, including both the uniformly spaced subcarriers and randomly spaced ranging subcarriers, may be used for frequency domain correlation. The IFFT size during delay estimation may be equal to the total number of subcarriers used in the OFDM symbol, since relative spacing between the ranging subcarriers cannot be altered. Moreover, a correlation peak may give an unambiguous delay estimate if the delay is less than that corresponding to N samples, where N is the total number of subcarriers in the OFDM symbol.

Pursuant to an exemplary scenario, OFDMA refers to a multi-carrier modulation technique using a plurality of orthogonal subcarriers for providing multiplexing of multi-users. In an OFDMA system, an available spectrum may be divided into one or more subcarriers and each sub-carrier may be modulated by data. The OFDMA system supports multiple access by users by enabling allocation of different subcarriers to different users. Also in OFDMA system, the subcarriers are orthogonal and may be closely spaced so as to provide efficient spectrum utilization. Each of the subcarriers may be modulated using various modulation techniques such as, quadrature amplitude modulation (QAM). Initially, data for transmission is mapped into one or more complex valued symbols that are modulated onto the subcarriers. One or more OFDM symbols may be generated by performing an IFFT on a set of modulated subcarriers. Typically, a cyclic prefix is created and appended to the beginning of each of the OFDM symbols before the OFDM symbols are amplified and transmitted (for example, from a customer premises equipment (CPE) to a base station (BS)). During reception (for example, at the BS), the OFDM symbols are processed using a fast Fourier transform (FFT) to recover the modulated subcarriers and the transmitted OFDM symbols may be recovered from the recovered modulated subcarriers and the recovered OFDM symbols may be decoded to arrive at the transmitted data.

In OFDMA based system that supports CPEs being positioned at large distances from the BS causing a delay larger than the delay corresponding to a cyclic prefix used, a process of ranging is indispensable. The process of ranging enables the BS to command a CPE to advance a timing boundary sufficiently so that a received frame boundary of the CPE approximately aligns with a frame boundary of other CPEs that are already linked to the BS and also enables power and frequency corrections to be applied to the CPEs so as to facilitate all the CPEs to appear co-located and synchronized.

Pursuant to an exemplary scenario, for the purpose of ranging, a CPE may transmit a ranging code such as for example a CDMA code or a Zadoff-Chu (ZC) sequence or a combination of both, on—allocated ranging subcarriers in the OFDM symbols specified to be used for ranging that includes appropriate cyclic shifts for different OFDM symbols in time domain to maintain phase continuity. The BS may subsequently detect the ranging signal transmitted from the CPE to estimate one or more ranging parameters that require adjustment and informs the same to the CPE.

Figure 1B:
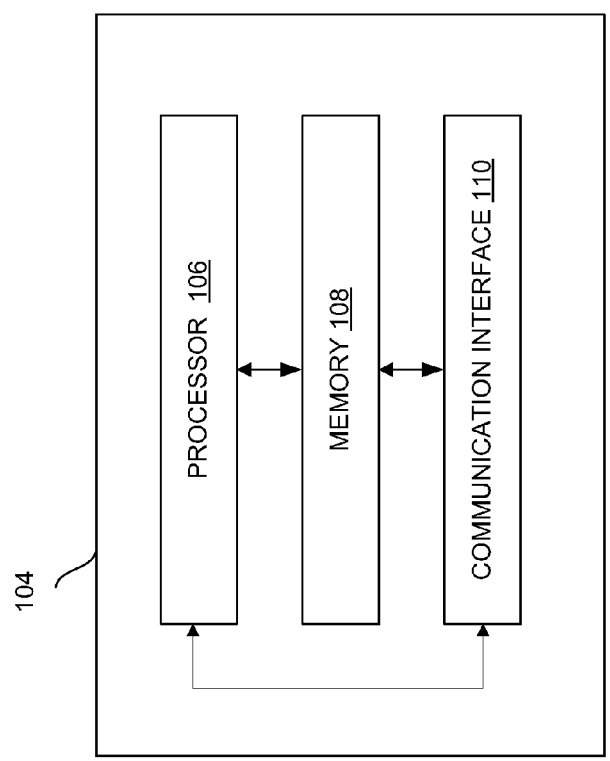
FIG. 1B depicts a base station of the OFDMA system of FIG. 1A, in accordance with an embodiment.

FIG. 1A depicts a block diagram representation of an OFDMA system 100, in accordance with an embodiment. In an embodiment, the OFDMA system 100 includes one or more CPEs, such as CPEs 102A-N interacting with at least one BS, such as BS 104. An example of the one or more CPEs 102A-N includes, but is not limited to a personal computer, a mobile communication device, a smart phone, a tablet PC, a laptop, a desktop, an ultra-book, a router, a switch, and the like. Each of the CPEs 102 A-N may be communicatively associated with the BS 104 via a network. In one embodiment, the network may be for example, internet, a wired cable network, a broadcasting network, and/or a wireless communication network. FIG. 1B depicts a block diagram representation of BS 104 of the OFDMA system 100 of FIG. 1A, in accordance with an embodiment. In an embodiment, the BS 104 may include at least one processor, such as processor 106, at least one memory, such as memory 108, and/or at least one communication interface, such as communication interface 110. The processor 106 may include a single processing unit or a plurality of processing units. Examples of the processor 106 may include but is not limited to microprocessor, microcomputer, central processing unit, microcontroller, digital signal processor, field programmable gate array, programmable logic device, state machine, logic circuitry, analog circuitry, digital circuitry, and the like. Examples of the memory 108 may include, but is not limited to, a read only memory, a random access memory, a volatile memory, a non-volatile memory, a static memory, a dynamic memory, a flash memory, a cache memory, and/or any device that stores digital information. In an embodiment, the communication interface 110 may include functionality of a transmitter/receiver.

The processor 106 may be configured to perform one or more steps of the method disclosed herein. The BS 104 and the CPEs 102 A-N may range from a highly optimized hardware to a highly flexible cognitive radio platform capable of supporting wide range of radio frequencies and modulation schemes and dynamically switching between them in realtime. In one embodiment, BS 104 and the CPEs 102A-N may also support a virtual machine (VM) model containing primitives. The virtual machine (VM) may be an analogous to a Java Virtual Machine (JVM), an abstract computing machine defined by a specification, omitting an implementation and run-time details. As used herein the term "virtual machine" refers to a platform-independent execution environment that converts byte-code into machine language and executes it.

In an embodiment, the BS 104 may be adapted to operate as a ranging receiver and the CPE 102N may be adapted to operate as a ranging transmitter. The CPE (such as, CPE 102N) serving as a ranging transmitter may send a ranging signal for initial ranging in the form of one or more OFDM symbols. In an embodiment, the ranging signal may modulate the ranging subcarriers. In an embodiment, multiple CPEs 102A-N may be allowed to range simultaneously, however the probability of such simultaneous ranging may be reduced by using an exponential back-off algorithm. In an embodiment, the CPEs 102A-N may be differentiated based on a ranging code used by each of the CPEs 102A-N. The ranging code may include any code or a sequence with good autocorrelation and cross-correlation properties, such as for example a CDMA code or a ZC sequence. It is noted that although for the purpose of illustration the detailed description refers to a CDMA code or a ZC sequence at various instances; however it is noted that in all such instances the CDMA code and/or the ZC sequence may be replaced with any other code/sequence with good autocorrelation and cross-correlation properties.

The CPE 102N completes a downlink synchronization process and may establish a sampling frequency and a frame boundary timing Subsequently the CPE 102N may modulate the ranging subcarriers and transmit the ranging signal as if co-located with the BS 104. The CPE 102N may modulate the ranging subcarriers with a CDMA code/ZC sequence prior to transmitting the ranging signal in the form of an OFDM symbol as if it is co-located with the BS 104. The CPE 102N may modulate those subcarriers in the OFDM symbols which are allocated for ranging. In an embodiment, the CPE 102N may modulate uniformly spaced subcarriers and randomly spaced subcarriers with two different sequences or may modulate the uniformly spaced subcarriers and randomly spaced subcarriers together by a single sequence.

Figure 2A:
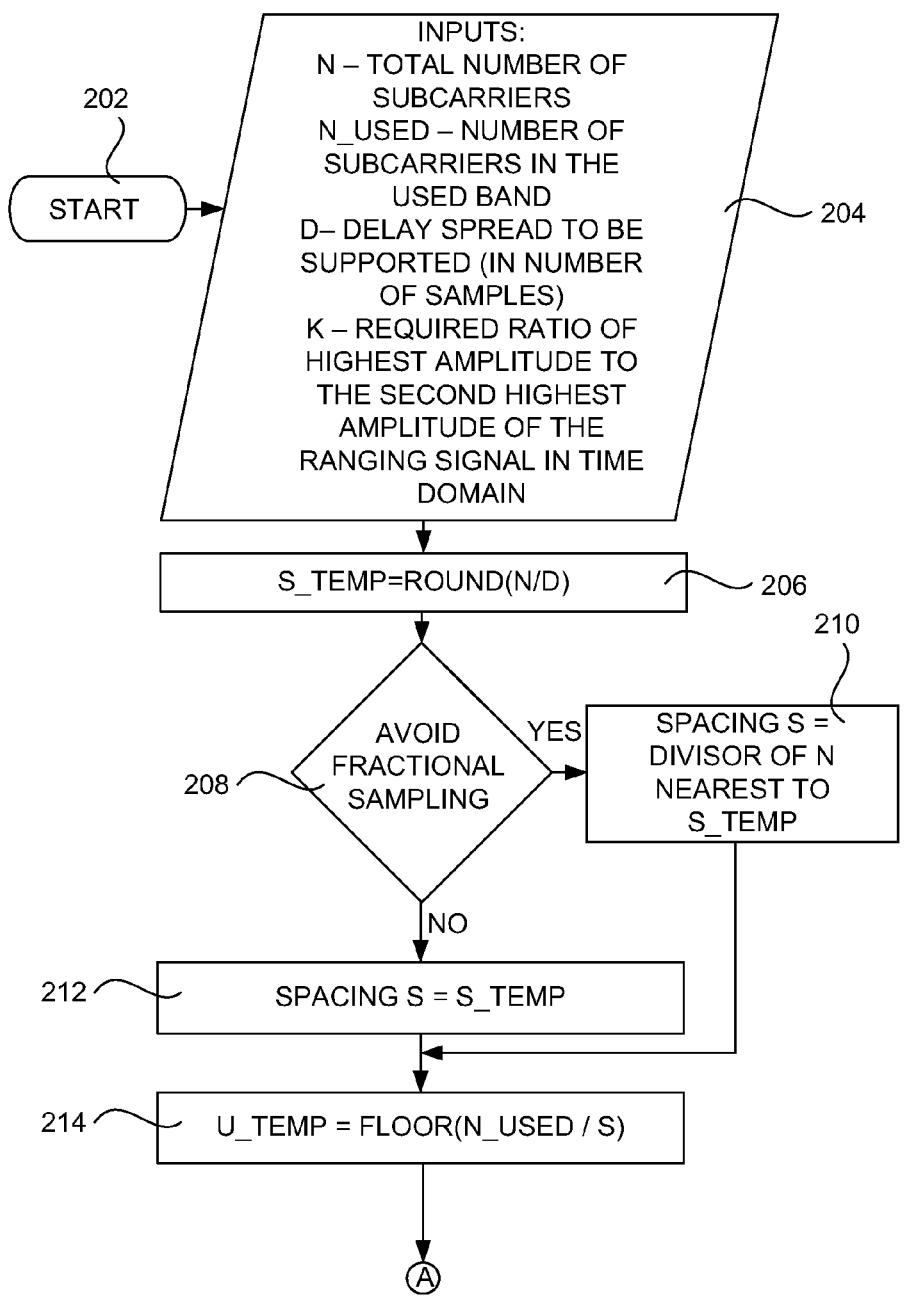
FIGS. 2A-2B depict a process of subcarrier allocation at a customer premises equipment serving as a transmitter, in accordance with an embodiment.
Figure 2B:
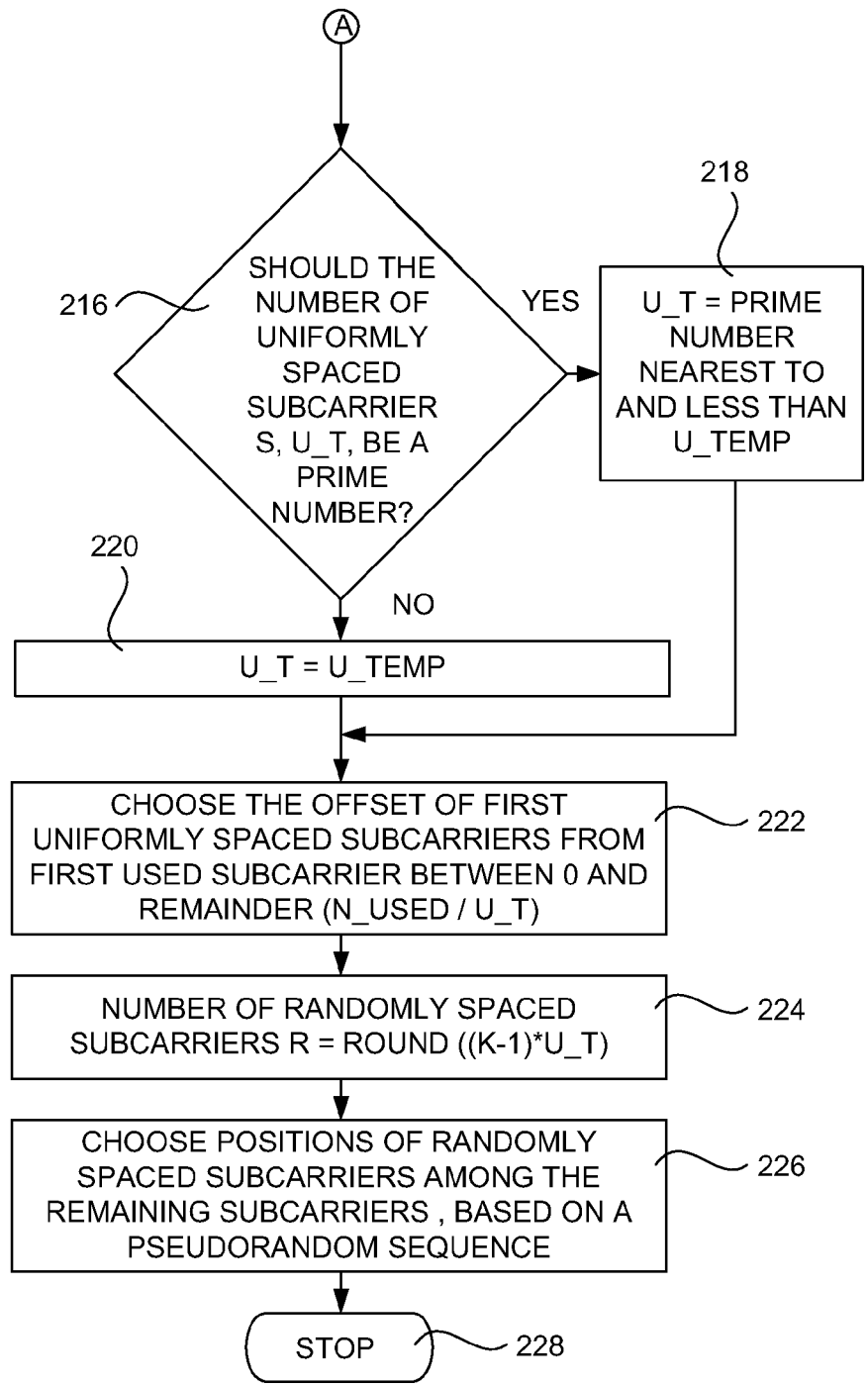

FIGS. 2A-2B depict a process of subcarrier allocation at the CPE 102N serving as a transmitter, in accordance with an embodiment. The process begins at 202. At step 204 a total number of subcarriers (N) in the OFDM symbol, number of subcarriers in the used band (Nosed), a delay spread to be supported in terms of number of samples (D) (depending on a terrain), and a required ratio of highest amplitude to a second highest amplitude of the ranging signal in time domain (K) is determined. In an embodiment, a sampling rate is considered to be inverse of the bandwidth. At step 206, a subcarrier spacing (S) is selected based on a rounded value of ratio of the determined total number of subcarriers N and the determined delay spread D to be supported in terms of number of samples. The rounded off value of ratio N/D is saved as a temporary value of subcarrier spacing (S_Temp). At step 208, it is determined if it is intended to avoid fractional sampling. If at step 208 it is determined that fractional sampling is to be avoided, then at step 210, the subcarrier spacing is selected based on a divisor of the total number of subcarriers nearest to the ratio or based on the ratio. Alternatively, if at step 208 it is determined that fractional sampling need not be avoided, then at step 212, spacing is selected such that an integer nearest to the value of ratio N/D gives an optimum spacing for the uniformly spaced subcarriers. In an embodiment, S may be selected such that S is a divisor of N to avoid fractional sampling effects in time domain. In an embodiment, the positions and spacing of uniformly spaced subcarriers are selected such that at least a predetermined number of ranging subcarriers used by the CPE transmitter are present among the selected positions. The predetermined number is determined based on a performance desired.

At step 214, a temporary value of number of uniformly spaced subcarriers (U-Temp) is assigned an integer nearest to and less than or equal to a ratio of the number of used subcarriers and selected spacing. At step 216, it is determined if the number of uniformly spaced subcarriers should be a prime number. If at step 216 it is determined if the number of uniformly spaced subcarriers should be a prime number, then at step 218 a prime number nearest to and less than the ratio of the number of used subcarriers and the selected spacing is assigned to the number of uniformly spaced subcarriers. Alternatively if at 216 it is determined that the number of uniformly spaced subcarriers need not be a prime number, then at step 220, the number of uniformly spaced subcarriers is assigned the temporary value of the number of uniformly spaced subcarriers. In an embodiment, $U_t$ is selected to be a largest integer less than the value of $N_{used}/S$. The value may be rounded off to the largest prime number lower than the value of $N_{used}/S$ if ZC sequences are to be used as part of ranging codes over the uniformly spaced subcarriers. At step 222, an offset of a first uniformly spaced subcarrier from the first used subcarrier is selected to be between 0 and remainder of division of the number of used subcarriers and the selected number of uniformly spaced subcarriers ($N_{used}/U_t$). At step 224, a number of randomly spaced subcarriers is selected to be equivalent to a rounded value of product of (K−1) and the selected number of uniformly spaced subcarriers. Consider for example, if K is the ratio of the highest peak to the second highest peak of the ranging signal in time domain (that is desired), the number of randomly spaced subcarriers R is given by the integer nearest to the value of $(K-1)*U_t$. The positions of the randomly spaced subcarriers may be selected from among the subcarrier positions remaining in the $N_{used}$ subcarriers after $U_t$ uniformly spaced subcarrier positions are selected.

At step 226, positions of randomly spaced subcarriers (R) are selected based on a pseudorandom sequence. The total number of ranging subcarriers C is then $U_t$+R. The uniformly spaced and randomly spaced subcarriers may be modulated by two different sequences or may be modulated together by a single sequence. If one of the values mentioned above are fixed beforehand, other values may have to be compromised for final subcarrier selection. For example, if C is fixed, then the value of D can be changed to fit the equations, resulting in support for possibly lesser delay spreads. If the D cannot be changed, then value of K may have to be lowered, resulting in degraded ranging receiver performance. The process ends at 228. In an embodiment, CDMA or ZC sequences may be used to modulate the uniformly spaced subcarriers and the CDMA sequence may be used to modulate the randomly spaced subcarriers. In an embodiment, N is chosen to be 2048, $N_{used}$ is chosen to be 1680, S is chosen to be 16, $U_t$ is chosen to be 103 and R is chosen to be 65. The ZC sequences may be used on uniformly spaced subcarriers as they have better autocorrelation properties than the CDMA sequences when $U_r$ is a prime number, so as to ensure good performance in noisy scenarios. The ZC sequences are widely used in various standards such as, Long-Term Evolution (LTE). In an embodiment, the ZC sequences may be used to modulate the uniformly spaced subcarriers and CDMA sequences may be used to modulate the randomly spaced subcarriers.

Figure 2C:
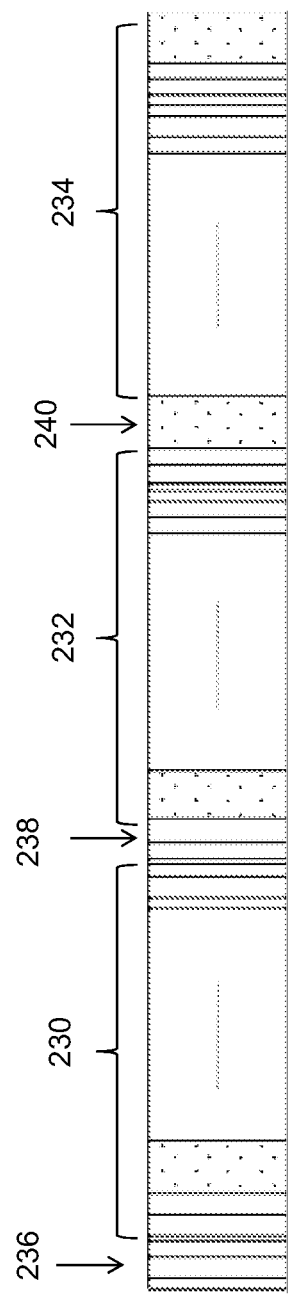
FIG. 2C exemplarily illustrates a structure of first three orthogonal frequency division multiplexing (OFDM) symbols of an OFDMA frame associated with a ranging signal, in accordance with an embodiment.

FIG. 2C exemplarily illustrates a structure of first three OFDM symbols 230, 232, and 234 of an OFDMA frame associated with a ranging signal that may be transmitted from a CPE (such as CPE 102N) to the BS 104 for initial ranging purposes in IEEE 802.22 standard, in accordance with an embodiment. The three OFDM symbols 230, 232, and 234 may constitute first three OFDM symbols from among first five OFDM symbols of an upstream frame associated with an initial ranging signal. In an embodiment, the OFDM symbols 230, 232, and 234 may be populated for ranging purposes and the last two OFDM symbols (not shown) may be used as a buffer to account for delays up to for example, 100 kilometers. In an embodiment, the second OFDMA symbol 232 and third OFDM symbol 234 may be cyclically shifted versions of the first OFDM symbol 230, to ensure existence of a phase continuity between any two OFDM symbols which ensures that sub-carrier orthogonality is not lost in at least one OFDM symbol even while a propagation delay is more than a cyclic prefix of the OFDM symbols (up to delays corresponding to 100 Km). FIG. 2A also depicts cyclic prefixes 236, 238, and 240 created and appended to the beginning of the OFDM symbols 230, 232, and 234 respectively, before the OFDM frame is amplified and transmitted.

In an embodiment, the BS 104 of the OFDMA system 100 of FIG. 1, is configured to receive an OFDM symbol transmitted from the CPE 102N. The received OFDM symbol may include one or more uniformly spaced subcarriers and/or one or more randomly spaced ranging subcarriers. In an embodiment, the OFDM symbol received from the CPE at the BS may be a third OFDM symbol in an OFDMA system 100 operating as per IEEE 802.22 standard. In another embodiment, the OFDM symbol received from the CPE at the BS may be a second OFDM symbol in the OFDMA system 100 operating as per WiMAX standard. In an embodiment, an OFDM symbol devoid of phase discontinuity may be extracted by the BS 104 from the received one or more OFDM symbols. In an embodiment, the extracted OFDM symbol may be cyclically shifted, after removing the cyclic prefix, to compensate for a shift introduced in the OFDM symbol by the CPE 102N before transmission to the BS 104. In an embodiment, the BS 104 demodulates the OFDM symbol (for example, third OFDM symbol in IEEE 802.22 standard and second OFDM symbol in WiMAX standard) by performing a fast Fourier transform (FFT) for obtaining a plurality of subcarriers. The subcarriers may include one or more data subcarriers and/or one or more ranging subcarriers. As used herein the term "data subcarriers" refers to subcarriers associated with data other than data relevant for ranging purposes.

As used herein the term "ranging subcarriers" refers to subcarriers associated with data relevant for ranging purposes. Also the subcarriers may include one or more uniformly spaced subcarriers and/or one or more randomly spaced ranging subcarriers. In an embodiment, the BS 104 multiplies one or more data subcarriers by zeros to obtain a plurality of resultant subcarriers and stores the plurality of resultant subcarriers (comprising one or more ranging subcarriers and/or one or more data subcarriers) in the memory associated with the BS 104. In an embodiment, one or more ranging subcarriers alone from among the obtained plurality of resultant subcarriers may be stored. However, while retrieving the stored plurality of resultant subcarriers for subsequent use, the data subcarriers (which are zeros) may be reintroduced along with the ranging subcarriers so as to maintain a relative spacing of the ranging subcarriers. The one or more ranging subcarriers may be associated with one or more ranging codes. In an embodiment, each of the one or more ranging codes may be associated with a ranging CPE from among one or more ranging CPEs associated with the OFDMA system.

In an embodiment, the BS 104 is configured to extract a plurality of uniformly spaced subcarriers with a predetermined spacing from among the stored one or more subcarriers and starting form a predetermined subcarrier position such that, with the predetermined spacing and the predetermined starting subcarrier position, the extracted plurality of uniformly spaced subcarriers includes a predetermined number of ranging subcarriers, such as a maximum number of ranging subcarriers possible. For example, if the stored subcarriers are numbered 1, 2, 3, . . . 16 and the predetermined spacing is chosen to be 4, then a set of four uniformly spaced subcarriers with a spacing of 4 that may extracted may include one of a first set of subcarriers 1, 5, 9, and 13, a second set of subcarriers 2, 6, 10, and 14, a third set of subcarriers 3, 7, 11, and 15, or a fourth set of subcarriers 4, 8, 12, and 16. Among the first, second, third and fourth set of subcarriers, the set of subcarriers that includes a maximum number of ranging subcarriers may be extracted. For example, if the ranging subcarriers are 2, 3, 6, 9, 10, 13, 15 and 16, the first set of subcarriers has two ranging subcarriers (9 and 13), the second set of subcarriers has three ranging subcarriers (2, 6 and 10), the third set of subcarriers has two ranging subcarriers (3 and 15) and the fourth set of subcarriers has one ranging subcarrier (16). Hence the second set of subcarriers may be extracted.

The size of the extracted uniformly spaced subcarrier set is U, which can be equal to a power of 2 to implement fast Fourier transform efficiently. In an embodiment, a predetermined number of uniformly spaced subcarriers with a predetermined spacing may be extracted from among the stored one or more subcarriers.

In an embodiment, the BS 104 may be configured to detect a presence or absence of the ranging CPE in the extracted uniformly spaced subcarriers based on a frequency domain correlation. In an embodiment, the BS 104 may be configured to detect a presence or absence of the ranging CPE in a predetermined number of extracted uniformly spaced subcarriers based on the frequency domain correlation. The consecutive subcarriers from among the pre-determined number of extracted subcarriers may be uniformly spaced from one another by a predetermined spacing. In an embodiment, the predetermined spacing is 16 and the pre-determined number is 128 for an OFDMA system which uses a band of 1680 subcarriers out of total 2048 subcarriers. The pre-determined spacing may be chosen to be 16 as 16 is a divisor of 2048 that is for example, a total number of subcarriers in IEEE 802.22 WRAN standard and consequently fractional sampling effects are avoided while estimating the delay in transmission from the CPE to the BS 104. Also choosing the spacing as 16 enables the ranging sub-carriers to span almost an entire transmission spectrum (that corresponds to for example, 1680 subcarriers) while fitting within the allotted number for example, 168. Additionally by choosing the spacing to be 16 a delay spread up to 128 samples may be supported. Furthermore, the pre-determined number of uniform subcarriers is chosen to be 128, as 128 is the smallest power of 2 greater than 105 (ratio of 1680 and 16) that represents a maximum number of uniformly spaced subcarriers with spacing of 16 that can be inserted within a set of 1680 subcarriers.

In an embodiment, for detecting presence of the ranging CPE, the BS 104 performs frequency domain correlation of data received on the extracted U uniformly spaced subcarriers. The frequency domain correlation may be performed by multiplying the ranging subcarriers within the extracted uniformly spaced subcarriers with the conjugate of the corresponding portion of the ranging code (for example, CDMA code/ZC sequence) from among the one or more ranging codes to obtain a product. The non-ranging subcarriers in the product may have zeros as their values. In an embodiment, the BS 104 may determine an inverse fast Fourier transform of the obtained product for obtaining a correlation output. In an embodiment, a U-point inverse fast Fourier transform may be performed. In an embodiment, the BS 104 may compare a peak of the correlation output with a threshold value. The BS 104 may detect presence of the ranging CPE associated with the ranging code in the extracted uniformly spaced subcarriers upon the peak exceeding the threshold value. Upon detecting presence of the ranging CPE using the ranging code the BS 104 may perform a delay estimation using the stored subcarriers. Upon the peak being within or equal to the threshold value the BS 104 may move on to a subsequent ranging code from among the one or more ranging codes and may detect presence or absence of a subsequent ranging CPE transmitting the subsequent ranging code to the BS. In order to estimate the delay, the BS 104 may perform the frequency domain correlation of the ranging code with the stored one or more subcarriers.

The frequency domain correlation may be performed by multiplying the one or more ranging sub carriers within the stored plurality of subcarriers with the conjugate of the ranging code (such as, CDMA code) associated with the ranging CPE detected to be present on the extracted uniformly spaced subcarriers, for obtaining a product, while maintaining relative positions of the ranging subcarriers unaltered. An inverse fast Fourier transform of the obtained product may be performed for obtaining a correlation output. The BS 104 may estimate a delay for the CPE based on position of a peak of the correlation output. The BS subsequently performs the detection of presence or absence of a next subsequent ranging CPE from among the one or more ranging CPEs based on a next subsequent ranging code. The detection of the ranging CPE and delay estimation are repeated iteratively for each of the one or more ranging codes until all the ranging codes are processed.

Figure 2D:
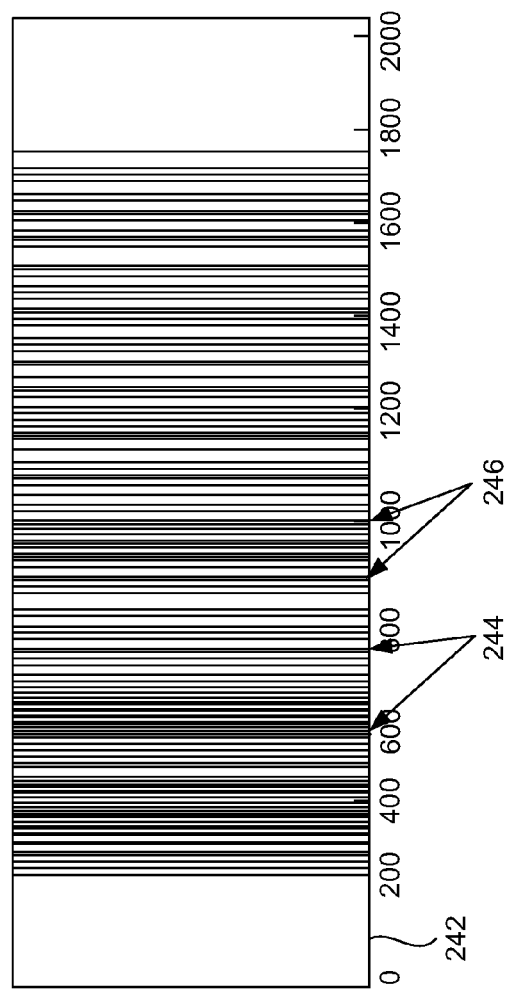
FIG. 2D illustrates randomly spaced subcarriers, in accordance with an exemplary scenario.

FIG. 2D depicts randomly spaced subcarriers plotted along x-axis 242, in accordance with an exemplary scenario. The randomly spaced subcarriers (as depicted in FIG. 2D) are non-uniformly spaced and lack structure. For example, the subcarriers pairs such as, 244 and 246 of FIG. 2D are spaced unequally as depicted in FIG. 2D. Ranging performed based on randomly spaced ranging subcarriers ensures only one peak in the output of the frequency domain correlation and thus there will be no ambiguity in delay estimates (for delays less than that corresponding to one OFDM symbol). FIG. 2E depicts a plurality of subcarriers selected for ranging purposes in the OFDMA system 100 of the present technology, in accordance with an embodiment. A plurality of ranging subcarriers 248 are plotted along x-axis 250 as depicted in FIG. 2E. Also depicted in FIG. 2E are a plurality of uniformly spaced subcarriers such as 252, 254 (represented by straight lines) plotted along x-axis 256 and that may be part of the plurality of ranging subcarriers 248 associated with ranging codes relevant for ranging purposes at the transmitter (such as a ranging CPE) or extracted from a plurality of subcarriers at the receiver, and a plurality of randomly spaced subcarriers such as 258, 260 (represented by dashed lines) also plotted along x-axis 256 that may be part of or extracted from the plurality of ranging subcarriers 248 for ranging purposes. In accordance with various embodiments of the methods disclosed herein, a pre-determined number (for example, 103) of uniformly spaced subcarriers with a pre-determined spacing (for example 16) may be part of ranging subcarriers at the transmitter (such as a ranging CPE), and a pre-determined number (for example, 128) of uniformly spaced subcarriers with a pre-determined spacing (for example 16) may be extracted for determining presence of a ranging code (indicative of a presence of a corresponding ranging CPE transmitting the ranging code) in the extracted uniformly spaced subcarriers at the receiver. At the ranging receiver, the uniformly spaced subcarriers and randomly spaced ranging subcarriers may be pre-saved prior to the step of extraction of the pre-determined number of uniformly spaced subcarriers and used subsequently for estimating delay in transmission of data from the CPEs to the BS upon detecting the ranging CPE.

Figure 3A:
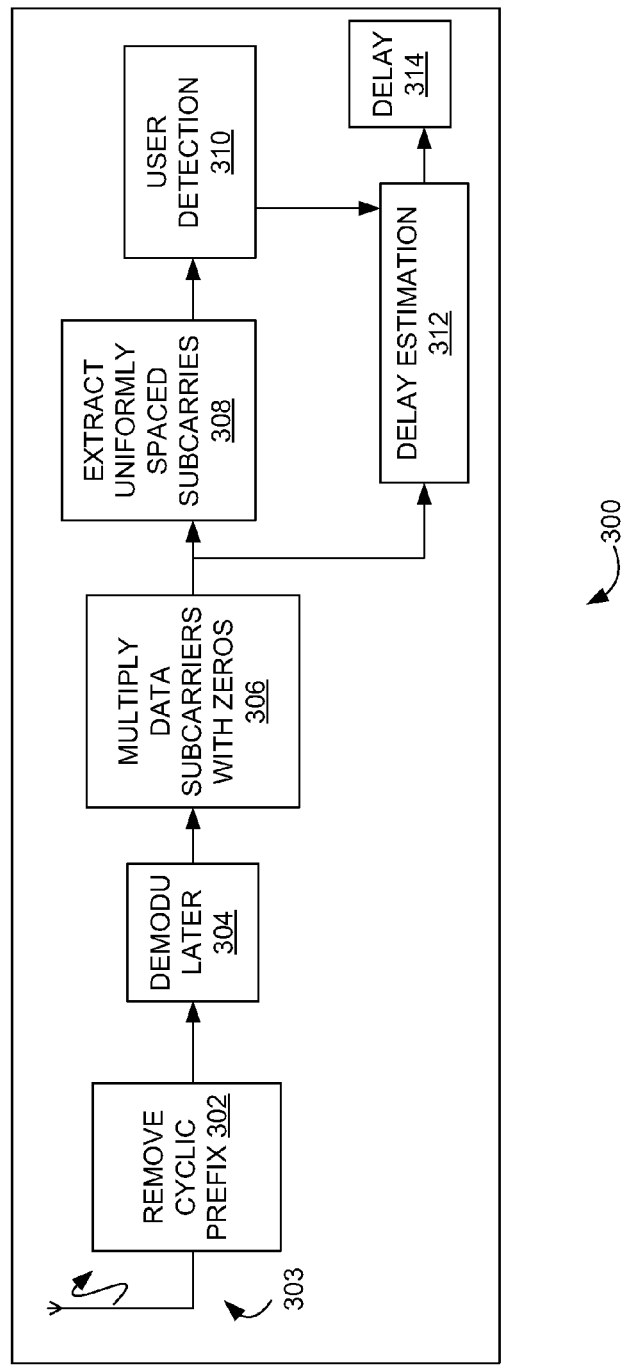
FIG. 3A is a diagrammatic process flow illustrating a ranging process, in accordance with an embodiment.

FIG. 3A is a diagrammatic process flow 300 illustrating a ranging process at the ranging receiver, according to an embodiment. As illustrated in FIG. 3A, various stages of the ranging process are shown by means of blocks, for example at 302, one or more OFDM symbols 303 containing data associated with ranging (ranging signal) may be received from one or more CPEs. In an embodiment, the OFDM symbols 303 may be received from a ranging CPE transmitter, in which the subcarriers are allocated based on the method/subcarrier allocation process as described in the description of FIGS. 2A-2B. In another embodiment, the OFDM symbols 303 may include subcarriers allocated based on a mechanism different from the method/subcarrier allocation process described in the description of FIGS. 2A-2B. Upon receiving the OFDM symbols, a cyclic prefix associated with the received OFDM symbols is removed so as to extract one or more OFDM symbols devoid of any phase discontinuity. In an embodiment, the extracted OFDM symbols may be cyclically shifted to compensate for any shift introduced by a transmitter associated with the CPEs. Subsequently at 304, the extracted OFDM symbols are demodulated by performing a fast Fourier transform of the OFDM symbols. At 306, one or more data subcarriers carrying data that are not relevant for ranging purposes are eliminated by multiplying the data subcarriers by zeroes and a plurality of resultant subcarriers are obtained and saved to be used subsequently during delay estimation at 312. At 308, a predetermined number of uniformly spaced subcarriers with a pre-determined spacing and starting form a predetermined subcarrier position are extracted from among the stored plurality of subcarriers such that, given the pre-determined spacing and the predetermined starting subcarrier position, the extracted plurality of uniformly spaced subcarriers includes a predetermined (such as a maximum possible) number of ranging subcarriers. At 310 a presence or absence of a ranging CPE on the extracted pre-determined number of uniformly spaced subcarriers is detected.

Figure 3B:
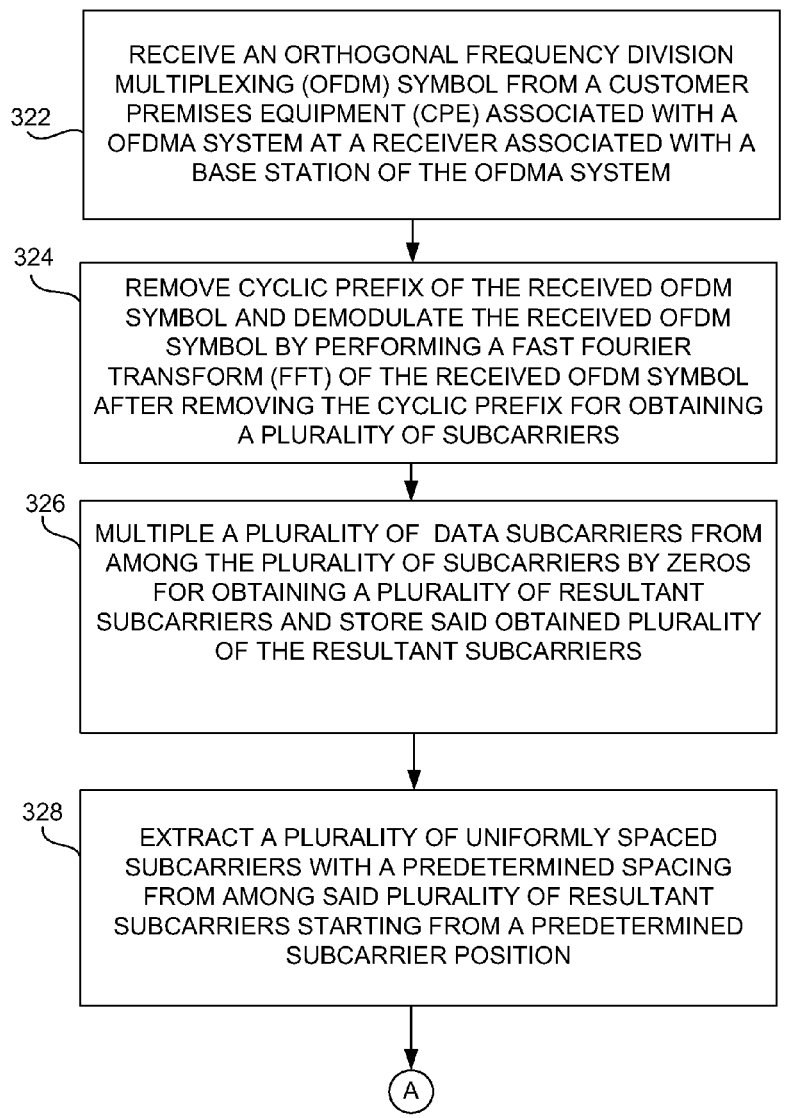
FIGS. 3B-3C depict a flow diagram of a method of ranging in an OFDM system, in accordance with an example embodiment.
Figure 3C:
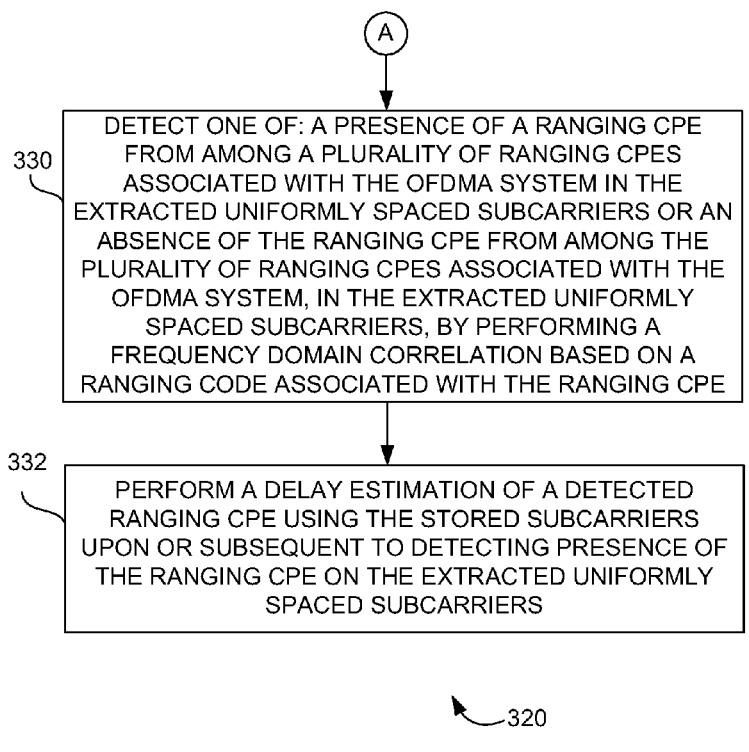

Upon presence of user being detected on the extracted pre-determined number of uniformly spaced subcarriers, at 312 a delay estimation is performed using the saved plurality of subcarriers including the uniformly spaced as well as randomly spaced ranging subcarriers to estimate and obtain delay 314 in transmission of data from the CPEs to the BS. FIG. 3B-3C depict a flow chart of a method 320 of ranging at a receiver associated with a BS of an OFDM system, according to an example embodiment. In an example, the method 320 may be performed in an OFDM system such as the OFDM system 100 as described with reference to FIG. 1A. In operation 322, an OFDM symbol transmitted from a CPE is received at a receiver associated with a BS of the OFDM system (such as OFDM system 100 of FIG. 1A). The received OFDM symbol may include one or more uniformly spaced subcarriers and/or one or more randomly spaced ranging subcarriers (as depicted in FIG. 2C). In an embodiment, the OFDM symbol received at the BS from the CPE may be a third OFDM symbol in an OFDMA system operating as per IEEE 802.22 standard. In another embodiment, the OFDM symbol received at the BS from the CPE may be a second OFDM symbol in the OFDMA system operating as per WiMAX standard. In an embodiment, an OFDM symbol devoid of phase discontinuity is extracted by the BS from the received one or more OFDM symbols. In an embodiment, the extracted OFDM symbol may be cyclically shifted, after removing the cyclic prefix, to compensate for a shift introduced by the CPE before transmission of the OFDM symbol from the CPE to the BS.

In an embodiment, at operation 324, a cyclic prefix of the received OFDM symbol (for example, third OFDM symbol in IEEE 802.22 standard and second OFDM symbol in WiMAX standard) is removed and then the received OFDM symbol is demodulated by performing a fast Fourier transform (FFT) of the received OFDM symbol for obtaining a plurality of subcarriers. The subcarriers may include one or more data subcarriers and/or one or more ranging subcarriers. As used herein the term "data subcarriers" refers to subcarriers associated with data other than data relevant for ranging purposes. As used herein the term "ranging subcarriers" refers to subcarriers associated with data relevant for ranging purposes. Also the subcarriers may include one or more uniformly spaced subcarriers and/or one or more randomly spaced ranging subcarriers.

At 326, a plurality of data subcarriers from among the plurality of subcarriers are multiplied by zeros to obtain a plurality of resultant subcarriers and the plurality of resultant subcarriers are stored in a memory associated with the BS for subsequent use. At operation 328, a plurality of uniformly spaced subcarriers with a predetermined spacing and starting form a predetermined subcarrier position are extracted from among the plurality of subcarriers such that, with the predetermined spacing and the predetermined starting subcarrier position, the extracted set contains maximum ranging subcarriers possible. In an embodiment, a predetermined number of uniformly spaced subcarriers may be extracted from among the stored subcarriers. The pre-determined number of extracted subcarriers may be uniformly spaced from one another by a predetermined spacing. In an embodiment, the pre-determined spacing is 16 and the pre-determined number is 128 for an OFDMA system which uses a band of 1680 subcarriers out of total 2048 subcarriers. The pre-determined spacing may be chosen to be 16 as 16 is a divisor of 2048 that is for example, a total number of subcarriers in IEEE 802.22 WRAN standard and consequently fractional sampling effects are avoided while estimating the delay in transmission from the CPE to the BS 104. Also choosing the spacing as 16 enables the ranging sub-carriers to span almost an entire transmission spectrum (that corresponds to for example, 1680 subcarriers) while fitting within the allotted number for example, 168. Additionally by choosing the spacing to be 16 a delay spread up to 128 samples may be supported. Furthermore, the pre-determined number of uniform subcarriers is chosen to be 128, as 128 is the smallest power of 2 greater than 105 (ratio of 1680 and 16) that represents a maximum number of uniformly spaced subcarriers with spacing of 16 that can be inserted within a set of 1680 subcarriers.

In an embodiment, at operation 330 a presence or absence of a ranging CPE in the extracted uniformly spaced subcarriers is detected based on a frequency domain correlation. In an embodiment, the presence or absence of the ranging CPE is detected in the predetermined number of extracted uniformly spaced subcarriers based on the frequency domain correlation. In an embodiment, for detecting presence of the ranging CPE, a frequency domain correlation of data received on the extracted uniformly spaced subcarriers is performed. The frequency domain correlation may be performed by multiplying the ranging subcarriers within the extracted uniformly spaced subcarriers with a conjugate of the corresponding part of the ranging code (for example, CDMA code/ZC sequence) from among the one or more ranging codes to obtain a product in which relative positions of the ranging subcarriers remain unaltered. In an embodiment, an inverse fast Fourier transform of the obtained product may be determined for obtaining a correlation output. In an embodiment, a U-point inverse fast Fourier transform may be performed, U being the pre-determined number of uniformly spaced subcarriers. In an embodiment, a peak of the correlation output may be compared with a threshold value. A presence of the ranging CPE associated with the ranging code in the extracted uniformly spaced subcarriers may be detected upon the peak exceeding the threshold value. Upon the peak being within or equal to the threshold value, a presence or absence of a subsequent ranging CPE transmitting the subsequent ranging code may be detected.

Upon detecting presence of the ranging CPE at operation 330, a delay estimation may be performed at operation 332 using the stored subcarriers. In order to estimate the delay, frequency domain correlation of the ranging code with the stored one or more ranging subcarriers may be performed. The frequency domain correlation may be performed by multiplying the one or more ranging sub carriers within the stored subcarriers with the conjugate of the ranging code (such as, CDMA code) associated with the ranging CPE detected to be present on the extracted uniformly spaced subcarriers, for obtaining a product, in which relative positions of the ranging subcarriers are maintained unaltered. An inverse fast Fourier transform of the obtained product may be performed for obtaining a correlation output. The delay for the CPE may be estimated based on position of a peak of the correlation output. The steps 330 and 332 are repeated iteratively for each of the one or more ranging codes associated with the OFDM symbol.

Figure 4A:
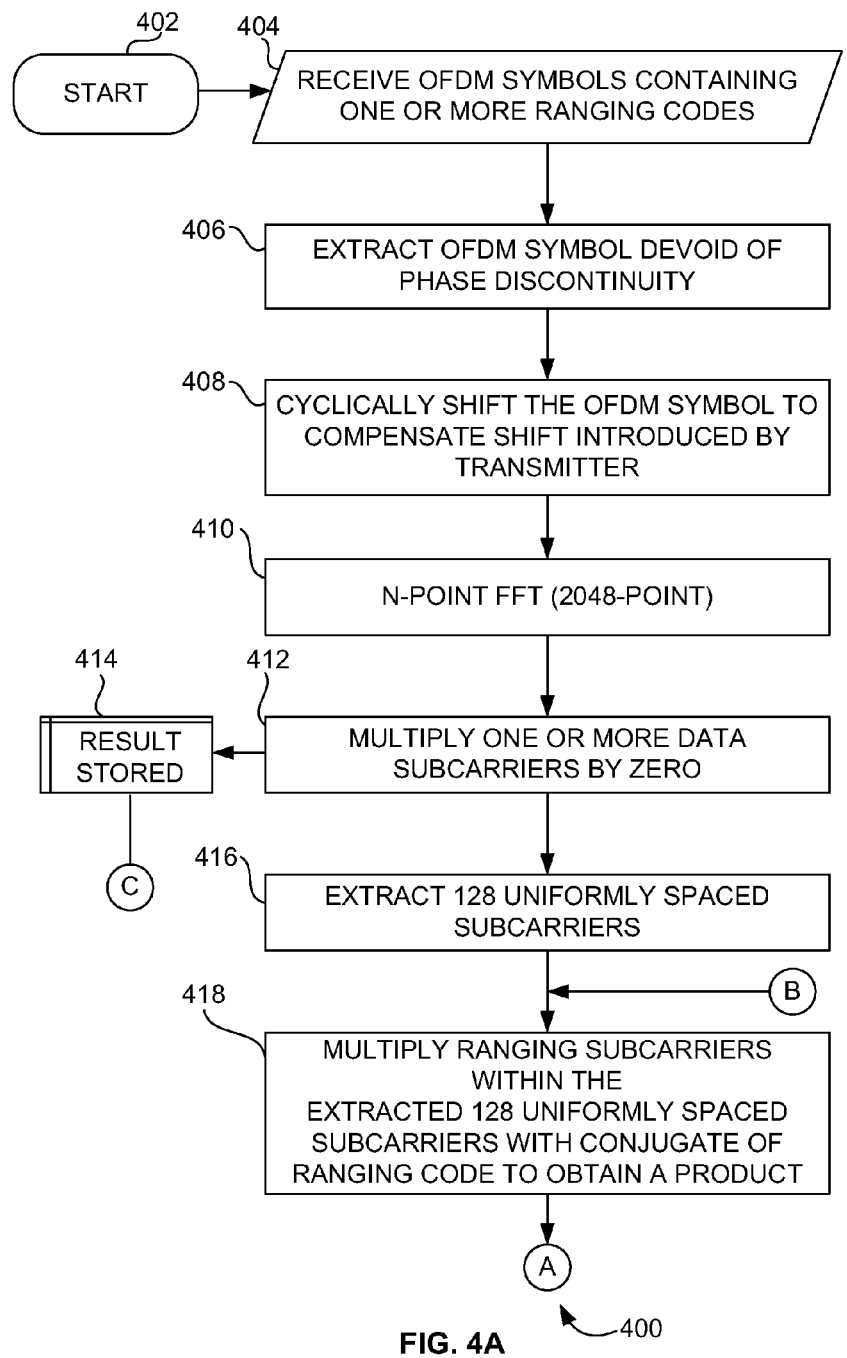
FIGS. 4A-4B depicts a flow chart illustrating a detailed process of ranging in an OFDMA system, in accordance with an embodiment.
Figure 4B:
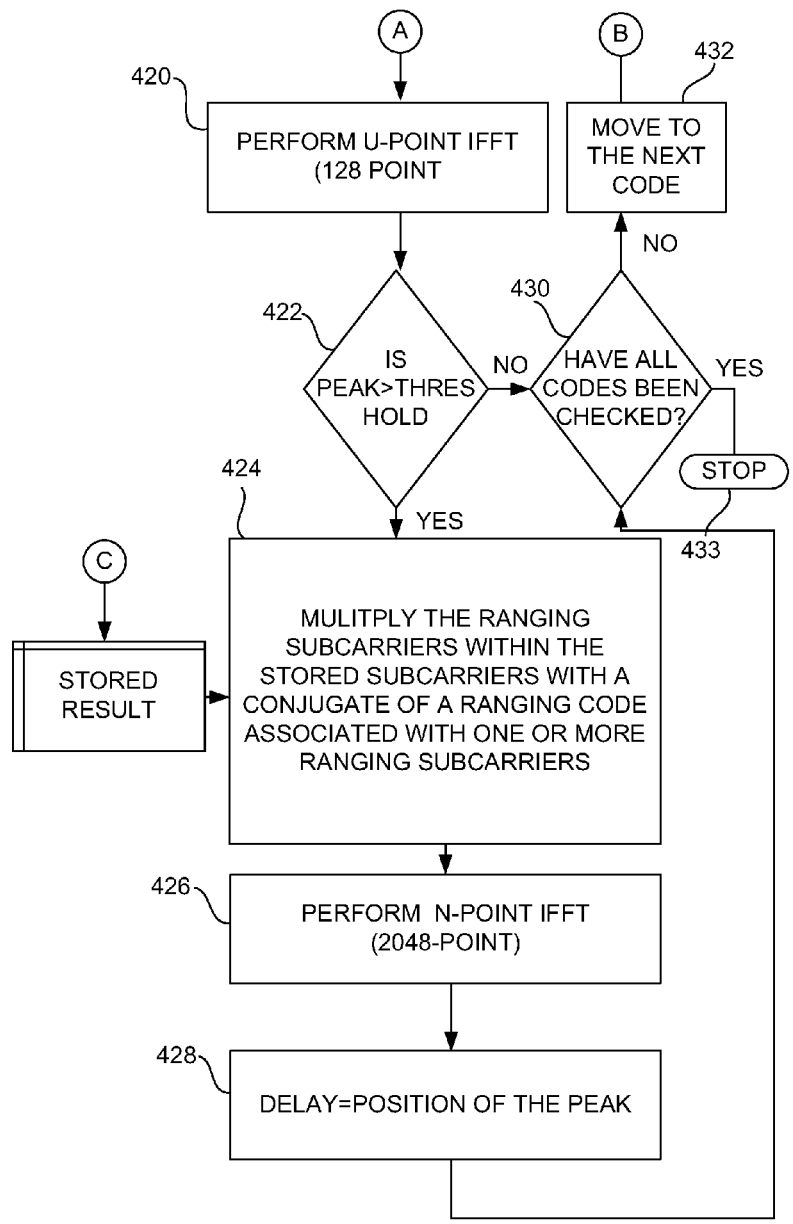

FIGS. 4A-4B depicts a flow diagram illustrating a process 400 of ranging at a receiver associated with a base station (such as 104 of FIG. 1) of an OFDMA system (such as 100 of FIG. 1), in accordance with an example embodiment. The process 400 starts at step 402 and proceeds to step 404. At step 404, one or more OFDM symbols containing one or more ranging codes are received at a BS. In an embodiment, the OFDM symbols may be received from a ranging CPE transmitter, in which the ranging subcarriers are allocated based on the method/subcarrier allocation process as described in the description of FIGS. 2A-2B. In another embodiment, the OFDM symbols may include ranging subcarriers allocated based on a mechanism different from the method/subcarrier allocation process described in the description of FIGS. 2A-2B. At step 406, an OFDM symbol devoid of any phase discontinuity (such as a third OFDM symbol of an OFDM frame) is extracted (as also explained earlier in the detailed description of FIG. 1A). At 408, the extracted OFDM symbol is cyclically shifted after removing the cyclic prefix to compensate for any shift introduced by the transmitter. At 410, an N point fast Fourier transform (FFT) is performed for the cyclically shifted OFDM symbol for demodulation purposes. N is a positive integer and represents a total number of subcarriers, for example 2048. Upon or subsequent to performing the N point FFT a plurality of subcarriers may be obtained. The plurality of subcarriers may include one or more uniformly spaced subcarriers and/or one or more randomly spaced ranging subcarriers. At 412, one or more data subcarriers are multiplied by zeros. At 414, the resultant plurality of subcarriers obtained by multiplying data subcarriers by zeros is stored, in for example a memory associated with the BS for subsequent use. At 416, 128 uniformly spaced subcarriers are extracted from the stored plurality of resultant subcarriers. The uniformly spaced subcarriers with a predetermined spacing and starting from a predetermined subcarrier position are extracted such that, the predetermined spacing and the predetermined starting subcarrier position ensure that the plurality of extracted uniformly spaced subcarriers includes a predetermined (such as a maximum possible) number of ranging subcarriers.

In an embodiment, the 128 uniformly spaced subcarriers are selected such that consecutive subcarriers from among the 128 uniformly spaced subcarriers are equally spaced from one another with a spacing of 16 subcarriers. Steps 418 to 422 are performed to detect presence or absence of a ranging code associated with a ranging CPE in the extracted 128 uniformly spaced subcarriers. At step 418, ranging subcarriers within the extracted 128 uniformly spaced subcarriers are multiplied with conjugate of the corresponding part of the ranging code to obtain a product. At 420 a U-point inverse fast Fourier transform (IFFT) is taken for the obtained product for obtaining a correlation output. In an embodiment U is 128. U is equal to the pre-determined number of uniformly spaced subcarriers that is 128. At step 422, a peak of the obtained correlation output is compared with a threshold value and it is determined if the peak is greater than the threshold value.

Upon peak being greater than the threshold, the presence of the ranging CPE is said to be detected and step 424 is performed. Upon peak being equal to or lesser than the threshold, at step 430 it is determined if all the ranging codes checked, if not a subsequent ranging code is selected at step 432 and the process is repeated from step 418. If all ranging codes are checked, the process ends at step 433. Steps 424 to 428 are performed for delay estimation. At step 424, ranging subcarriers within the stored plurality of subcarriers (stored result) and are multiplied with a conjugate of a ranging code associated with one or more ranging subcarriers for obtaining a product in which relative positions of the ranging subcarriers are maintained unaltered, the ranging code being associated with the ranging CPE detected to be present on the extracted 128 uniformly spaced subcarriers. At step 426 an N-point inverse fast Fourier transform of product is performed for obtaining a correlation output, N being for example 2048. At step 428, a delay for the ranging CPE is computed based on a position of a peak of the correlation output. Subsequent to step 428, step 430 is performed and the process from steps 418 onwards are repeated for a next subsequent ranging code from among the one or more codes received along with the OFDM symbol. If all the codes have been processed (if steps 418 onwards are performed for all the subsequent ranging codes), the process stops at 433.

Figure 5:
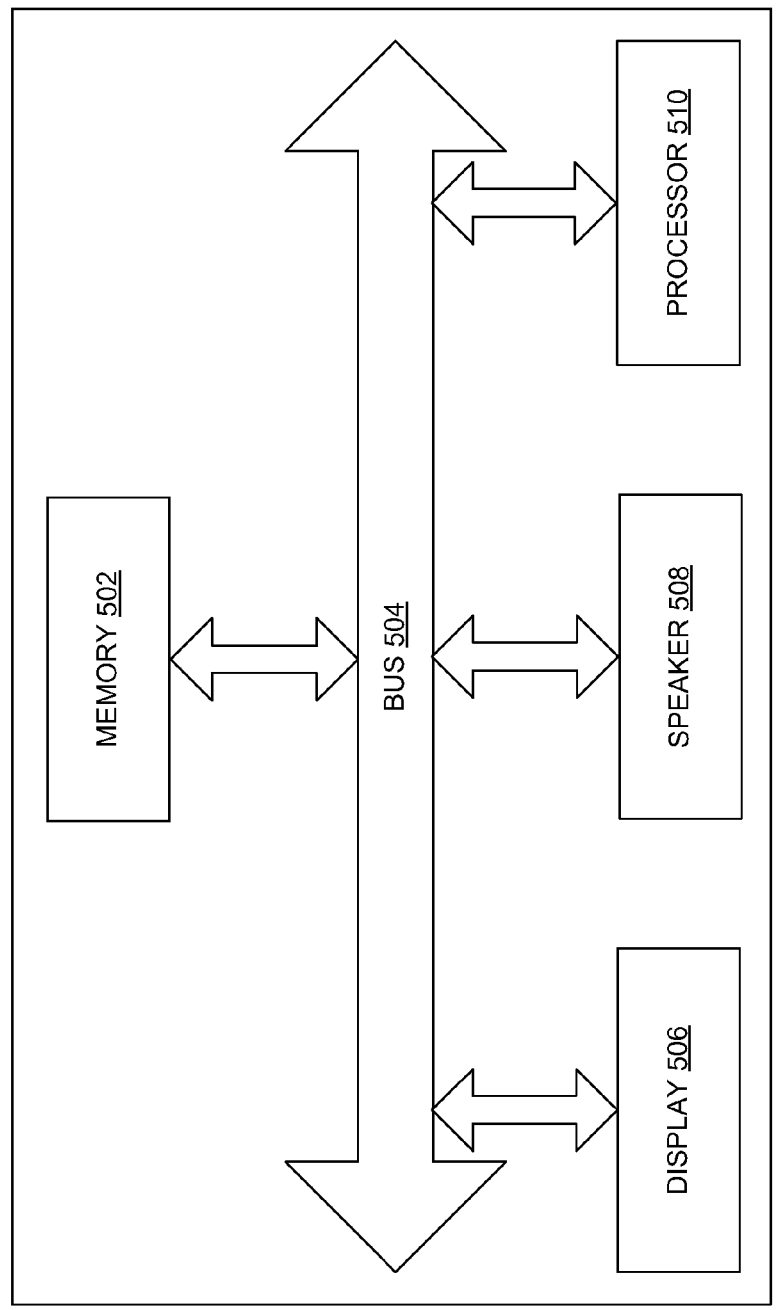
FIG. 5 illustrates an exploded view of the user equipment device to perform any one or more of the methodologies herein, according to an embodiment.

FIG. 5 illustrates an exploded view of the user equipment device having a memory 502 having a set of computer instructions, a bus 504, a display 506, a speaker 508, and a processor 510 capable of processing a set of instructions to perform any one or more of the methodologies herein, according to an embodiment herein. In one embodiment, the one or more user equipment devices 104A-N may be the personal communication device. The processor 510 may also enable digital content to be consumed in the form of video for output via one or more displays 506 or audio for output via speaker and/or earphones 508. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. A user 102 of the one or more user equipment devices 104A-N may view this stored information on display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the user equipment devices using the bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
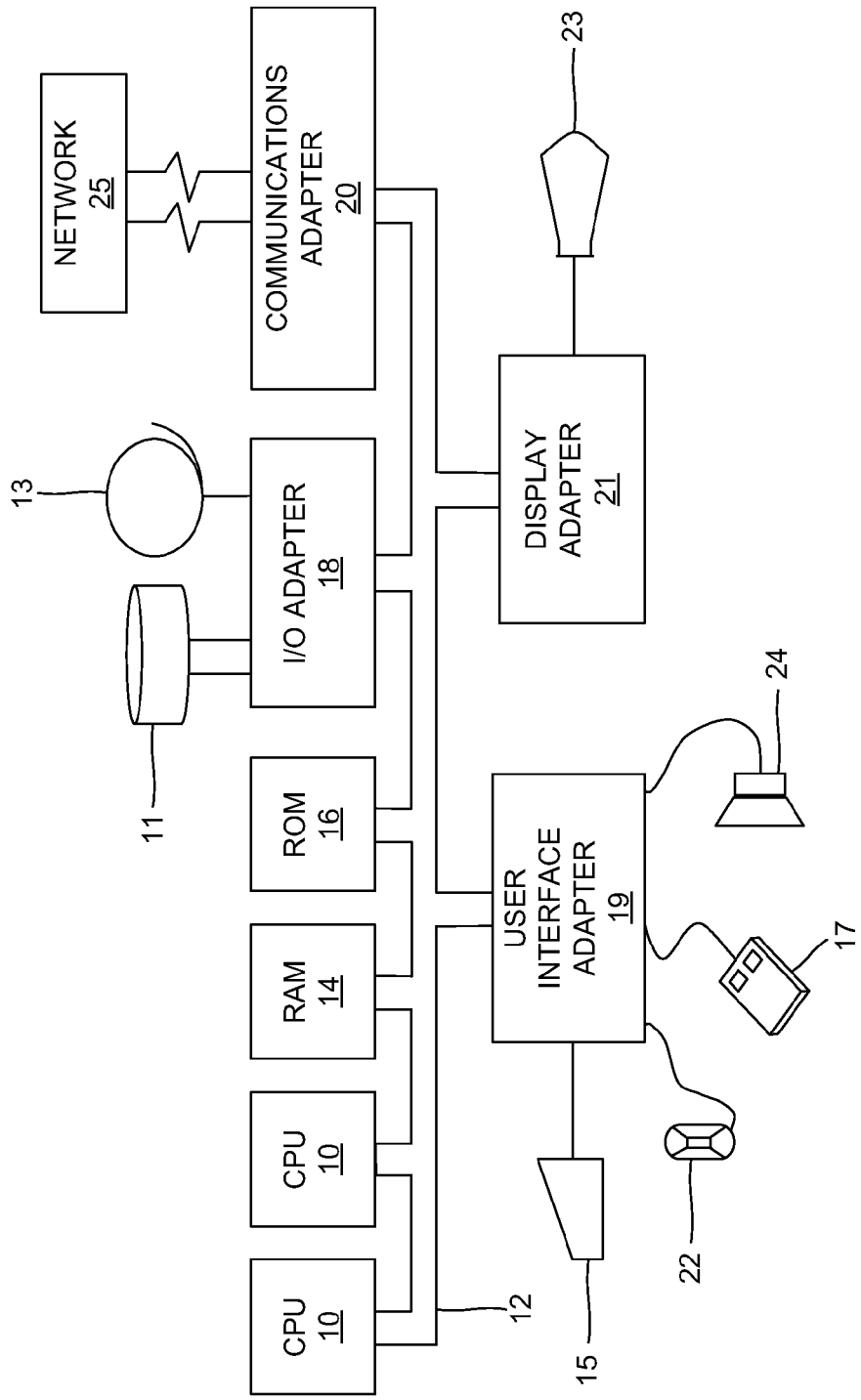
FIG. 6 depicts a representative hardware environment for practicing the embodiments of the OFDMA system of FIG. 1A, in accordance with an embodiment.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Although the present technology has been described with reference to specific example embodiments, it is noted that various modifications and changes is made to these embodiments without departing from the broad spirit and scope of the present technology. For example, the various devices, modules, and systems, described herein may be implemented and operated using hardware circuitry (e.g., a complementary metal oxide semiconductor (CMOS) based logic circuitry), and/or any combination of hardware and software (e.g., embodied in a machine readable medium). For example, the various electrical structures may be embodied using transistors, logic gates, and electrical circuits (e.g., ASIC circuitry and/or in Digital Signal Processor (DSP) circuitry) and drawings are to be regarded in an illustrative rather than a restrictive sense. Also, the circuits described and illustrated in the various embodiments as discrete or separate is combined or integrated with other systems, modules, without departing from the scope of the present technology. Other items shown or discussed as directly coupled or communicating with each other is coupled through some interface or device, such that the items may no longer be considered directly coupled to each other but may still be indirectly coupled and in communication, whether electrically, mechanically, or otherwise, with one another. Other examples of changes, substitutions, and alterations ascertainable by one skilled in the art, upon studying the example embodiments disclosed herein, may be made without departing from the spirit and scope of the present technology.

To provide optimal performance in changing scenarios, a dynamic network with ability to adapt to changes in the environment and the resources is achieved. The ability to gather information about the environment and other relevant data and adapt the network to perform optimally. In addition, the network monitors the changes in the environment and continuously performs optimally.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of ranging at a receiver in an orthogonal frequency division multiple access (OFDMA) system, said method comprising:

receiving an orthogonal frequency division multiplexing (OFDM) symbol from a customer premises equipment (CPE) associated with said OFDMA system at said receiver associated with a base station of said OFDMA system;

removing a cyclic prefix of said received OFDM symbol and demodulating said received OFDM symbol by performing a fast Fourier transform (FFT) of said received OFDM symbol for obtaining a plurality of subcarriers;

multiplying a plurality of data subcarriers from among said plurality of subcarriers by zeros for obtaining a plurality of resultant subcarriers and storing said obtained plurality of resultant subcarriers in a memory associated with said base station;

extracting a plurality of uniformly spaced subcarriers with a predetermined spacing from among said plurality of resultant subcarriers starting form a predetermined subcarrier position, wherein said predetermined spacing and said predetermined subcarrier position provides a predetermined number of ranging subcarriers within said extracted uniformly spaced subcarriers;

detecting one of: a presence of a ranging CPE from among one or more ranging CPEs associated with said OFDMA system in said extracted uniformly spaced subcarriers or an absence of said ranging CPE from among said one or more ranging CPEs associated with said OFDMA system, in said extracted uniformly spaced subcarriers, by performing a frequency domain correlation based on a ranging code associated with said ranging CPE; and performing a delay estimation of said detected ranging CPE using said stored subcarriers upon detecting presence of said ranging CPE on said extracted uniformly spaced subcarriers.

2. The method of claim 1, wherein said detecting comprises:

performing said frequency domain correlation of ranging data received on said extracted uniformly spaced subcarriers by:

multiplying said ranging subcarriers within said extracted uniformly spaced subcarriers with a conjugate of corresponding portion of a ranging code from among one or more ranging codes to obtain a product while maintaining relative positions of said ranging subcarriers unaltered, wherein said one or more of said ranging subcarriers within said extracted uniformly spaced subcarriers are associated with said one or more ranging codes, and wherein each of said one or more ranging codes is associated with a ranging CPE from among one or more ranging CPEs associated with said OFDMA system; and determining an inverse fast Fourier transform of said obtained product for obtaining a correlation output;

comparing peak of said obtained correlation output with a threshold value; and detecting one of: a presence of said ranging CPE associated with a ranging code, in said extracted uniformly spaced subcarriers upon said peak of said correlation output exceeding said threshold value and an absence of said ranging CPE associated with said ranging code in said extracted uniformly spaced subcarriers upon said peak of said correlation output being within or equal to said threshold value.

3. The method of claim 1, wherein performing said delay estimation comprising:

performing said frequency domain correlation of data received on said stored plurality of subcarriers by:

multiplying said ranging subcarriers within said stored subcarriers with a conjugate of a ranging code associated with one or more ranging subcarriers for obtaining a product, while maintaining relative positions of said ranging subcarriers unaltered; and performing an inverse fast Fourier transform of said product for obtaining a correlation output; and computing a delay for said ranging CPE based on a position of a peak of said correlation output.

4. The method of claim 2, further comprising:

detecting one of: a presence or an absence of a subsequent ranging CPE from among said one or more ranging CPEs, in said extracted uniformly spaced subcarriers, by performing a frequency domain correlation with a subsequent ranging code from among said one or more ranging codes, upon or subsequent to detecting an absence of said ranging CPE in said extracted uniformly spaced subcarriers, by:

multiplying said ranging subcarriers within said extracted uniformly spaced subcarriers with a conjugate of the corresponding portion of said subsequent ranging code from among said one or more ranging codes to obtain a product, while maintaining relative positions of said ranging subcarriers unaltered, wherein said subsequent ranging code is different from said ranging code from among said one or more ranging codes;

determining an inverse fast Fourier transform of said obtained product for obtaining a correlation output; and comparing peak of said obtained correlation output with a threshold value; and detecting one of: presence of said subsequent ranging CPE associated with said subsequent ranging code in said extracted uniformly spaced subcarriers upon said peak of said correlation output exceeding said threshold value and absence of said subsequent ranging CPE associated with said subsequent ranging code in said extracted uniformly spaced subcarriers upon said peak of said correlation output being within or equal to said threshold value.

5. The method of claim 4, further comprising performing said delay estimation upon or subsequent to detecting presence of said subsequent ranging CPE in said extracted uniformly spaced subcarriers by:

multiplying said ranging subcarriers within said stored subcarriers with a conjugate of said subsequent ranging code for obtaining a product while maintaining relative positions of said ranging subcarriers unaltered, wherein said subsequent ranging code is associated with said subsequent ranging CPE detected to be present on said extracted uniformly spaced subcarriers; and performing an inverse fast Fourier transform of said product for obtaining a correlation output; and computing a delay for said subsequent ranging CPE based on a position of a peak of said correlation output.

6. The method of claim 1, wherein steps of said detecting and said performing delay estimation are repeated iteratively for each of said one or more ranging codes.

7. The method of claim 1, further comprising performing prior to demodulating:

extracting an OFDM symbol devoid of a phase discontinuity from said received OFDM symbol and removing the cyclic prefix; and cyclically shifting said extracted OFDM symbol to compensate for a shift introduced by said CPE in said OFDM symbol before transmission.

8. The method of claim 1, wherein said OFDM symbol received from said customer premises equipment includes one or more subcarriers allocated based on a method comprising steps of:

determining a total number of subcarriers, number of subcarriers in a used band, a delay spread to be supported in terms of number of samples, a required ratio of highest amplitude to a second highest amplitude of the ranging signal in time domain (K);

selecting a subcarrier spacing based on a rounded value of ratio of said determined total number of subcarriers and said determined delay spread to be supported in terms of number of samples, wherein said subcarrier spacing is selected based on one of: a divisor of said total number of subcarriers nearest to said ratio or based on said ratio;

selecting a number of uniformly spaced subcarriers to be one of i) an integer nearest to and less than a ratio of said number of used subcarriers and said selected spacing or ii) a prime number nearest to and less than said ratio of said number of used subcarriers and said selected spacing;

selecting an offset of a first uniformly spaced subcarrier from a first used subcarrier to be between 0 and remainder of division of said number of used subcarriers and said selected number of uniformly spaced subcarriers;

selecting a number of randomly spaced subcarriers equivalent to a rounded value of product of (K−1) and said selected number of uniformly spaced subcarriers; and selecting positions of said randomly spaced subcarriers based on a pseudorandom sequence.

9. A method of ranging at a receiver in an orthogonal frequency division multiple access (OFDMA) system, said method comprising:

receiving an orthogonal frequency division multiplexing (OFDM) symbol from a customer premises equipment (CPE) associated with said OFDMA system at said receiver associated with a base station associated with said OFDMA system;

removing a cyclic prefix of said received OFDM symbol and demodulating said received OFDM symbol by performing a fast Fourier transform (FFT) of said received OFDM symbol for obtaining a plurality of subcarriers;

multiplying a plurality of data subcarriers from among said plurality of subcarriers by zeros for obtaining a plurality of resultant subcarriers and storing said plurality of resultant subcarriers;

extracting a predetermined number of uniformly spaced subcarriers spaced from one another with a predetermined spacing from among said resultant plurality of subcarriers starting form a predetermined subcarrier position, wherein said predetermined spacing and said predetermined subcarrier position provides a predetermined number of ranging subcarriers within said extracted uniformly spaced subcarriers;

detecting one of: a presence of a ranging CPE from among one or more ranging CPEs associated with said OFDMA system or an absence of said ranging CPE from among said one or more ranging CPEs associated with said OFDMA system, in said extracted uniformly spaced subcarriers, by performing a frequency domain correlation based on a ranging code associated with said ranging CPE; and performing a delay estimation using said stored plurality of subcarriers upon or subsequent to detecting presence of said ranging CPE on said extracted uniformly spaced subcarriers.

10. The method of claim 9, wherein said detecting comprises:

performing said frequency domain correlation of data received on said extracted predetermined number of uniformly spaced subcarriers by:

multiplying said ranging subcarriers within said extracted predetermined number of uniformly spaced subcarriers with a conjugate of corresponding portion of a ranging code from among one or more ranging codes to obtain a product while maintaining relative positions of said ranging subcarriers unaltered, wherein said one or more of said ranging subcarriers within said extracted uniformly spaced subcarriers are associated with said one or more ranging codes, and wherein each of said one or more ranging codes is associated with a ranging CPE from among one or more ranging CPEs associated with said OFDMA system; and determining an inverse fast Fourier transform of said obtained product for obtaining a correlation output;

comparing peak of said obtained correlation output with a threshold value; and detecting one of: a presence of said ranging CPE associated with a ranging code, in said extracted uniformly spaced subcarriers upon said peak of said correlation output exceeding said threshold value and an absence of said ranging CPE associated with said ranging code in said extracted uniformly spaced subcarriers upon said peak of said correlation output being within or equal to said threshold value.

11. The method of claim 9, wherein performing said delay estimation comprising:

performing said frequency domain correlation of data received on said stored subcarriers by:

multiplying said ranging subcarriers within said stored subcarriers with a conjugate of a ranging code associated with one or more ranging subcarriers from among said stored subcarriers for obtaining a product, while maintaining relative positions of said ranging subcarriers unaltered; and performing an inverse fast Fourier transform of said product for obtaining a correlation output; and computing a delay for said ranging CPE based on a position of a peak of said correlation output.

12. The method of claim 10, further comprising:

detecting one of: a presence or an absence of a subsequent ranging CPE from among said one or more ranging CPEs, in said predetermined number of uniformly spaced subcarriers, by performing a frequency domain correlation with a subsequent ranging code from among said one or more ranging codes, upon or subsequent to detecting an absence of said ranging CPE in said extracted uniformly spaced subcarriers, by:

multiplying said ranging subcarriers within said extracted uniformly spaced subcarriers with a conjugate of corresponding portion of said subsequent ranging code from among said one or more ranging codes to obtain a product while maintaining relative positions of said ranging subcarriers unaltered, wherein said subsequent ranging code is different from said ranging code from among said one or more ranging codes; and determining an inverse fast Fourier transform of said obtained product for obtaining a correlation output;

comparing peak of said obtained correlation output with a threshold value; and detecting one of: presence of said subsequent ranging CPE associated with said subsequent ranging code in said extracted uniformly spaced subcarriers upon said peak of said correlation output exceeding said threshold value and absence of said subsequent ranging CPE associated with said subsequent ranging code in said extracted uniformly spaced subcarriers upon said peak of said correlation output being within or equal to said threshold value.

13. The method of claim 12, further comprising performing said delay estimation upon or subsequent to detecting presence of said subsequent ranging CPE in said extracted uniformly spaced subcarriers by:

multiplying said ranging subcarriers within said stored subcarriers with a conjugate of said subsequent ranging code for obtaining a product while maintaining relative positions of said ranging subcarriers, wherein said subsequent ranging code is associated with said subsequent ranging CPE detected to be present on said predetermined number of extracted uniformly spaced subcarriers; and performing an inverse fast Fourier transform of said product for obtaining a correlation output; and computing a delay for said subsequent ranging CPE based on a position of a peak of said correlation output.

14. The method of claim 9, wherein steps of said detecting and said performing delay estimation are repeated iteratively for each of said one or more ranging codes.

15. The method of claim 9, further comprising performing prior to demodulating:
   extracting an OFDM symbol devoid of a phase discontinuity from said received OFDM symbol; and
   cyclically shifting said received OFDM symbol to compensate for a shift introduced by said CPE in said OFDM symbol before transmission from said CPE.

16. The method of claim 9, wherein said predetermined number of uniformly spaced subcarriers is 128 and said predetermined spacing is 16, and wherein said OFDMA system considered comprises a total of 2048 subcarriers and a band of 1680 subcarriers from among said 2048 subcarriers is used for said method.

17. The method of claim 9, wherein said OFDM symbol received from said customer premises equipment includes one or more subcarriers allocated based on a method comprising steps of:
   determining a total number of subcarriers, number of subcarriers in a used band, a delay spread to be supported in terms of number of samples, a required ratio of highest amplitude to a second highest amplitude of the ranging signal in time domain (K);
   selecting a subcarrier spacing based on a rounded value of ratio of said determined total number of subcarriers and said determined delay spread to be supported in terms of number of samples, wherein said subcarrier spacing is selected based on one of: a divisor of said total number of subcarriers nearest to said ratio or based on said ratio;
   selecting a number of uniformly spaced subcarriers to be one of i) an integer nearest to and less than a ratio of said number of used subcarriers and said selected spacing or ii) a prime number nearest to and less than said ratio of said number of used subcarriers and said selected spacing;
   selecting an offset of a first uniformly spaced subcarrier from a first used subcarrier to be between 0 and remainder of division of said number of used subcarriers and said selected number of uniformly spaced subcarriers;
   selecting a number of randomly spaced subcarriers equivalent to a rounded value of product of (K−1) and said selected number of uniformly spaced subcarriers; and
   selecting positions of said randomly spaced subcarriers based on a pseudorandom sequence.

18. The method of claim 17, wherein said selected number of uniformly spaced subcarriers is about 103, said selected subcarrier spacing is about 16 and said number of randomly spaced subcarriers is 65, for said total number of subcarriers of 2048 with 1680 number of subcarriers in said used band.

19. An orthogonal frequency division multiple access (OFDMA) system comprising:
   at least one customer premises equipment; and
   at least one base station communicatively associated with said at least one customer premises equipment, said at least one base station comprising:
      at least one memory; and
      at least one processor configured to perform the steps comprising:
         receiving an orthogonal frequency division multiplexing (OFDM) symbol from a customer premises equipment (CPE) associated with said OFDMA system;
         removing cyclic prefix of said received OFDM symbol and demodulating said received OFDM symbol by performing a fast Fourier transform (FFT) of said received OFDM symbol for obtaining a plurality of subcarriers;
         multiplying a plurality of data subcarriers from among said plurality of subcarriers by zeros for obtaining a plurality of resultant subcarriers and storing said plurality of resultant subcarriers;
         extracting a plurality of uniformly spaced subcarriers with a predetermined spacing from among said resultant plurality of subcarriers starting form a predetermined subcarrier position, wherein said predetermined spacing and predetermined subcarrier position provides a predetermined number of ranging subcarriers within said extracted uniformly spaced subcarriers;
         detecting one of: a presence of a ranging CPE from among one or more ranging CPEs associated with said OFDMA system or an absence of said ranging CPE from among said one or more ranging CPEs associated with said OFDMA system, in said extracted uniformly spaced subcarriers, by performing a frequency domain correlation based on a ranging code associated with said ranging CPE; and
         performing a delay estimation using said stored plurality of subcarriers upon or subsequent to detecting presence of said ranging CPE on said extracted uniformly spaced subcarriers.

20. The OFDMA system of claim 19, wherein said at least one processor is further configured to:
   performing said frequency domain correlation of ranging data received on said extracted uniformly spaced subcarriers by:
      multiplying the ranging subcarriers within said extracted uniformly spaced subcarriers with a conjugate of corresponding portion of a ranging code from among one or more ranging codes to obtain a product while maintaining relative positions of said ranging subcarriers, wherein said one or more of said ranging subcarriers within said extracted uniformly spaced subcarriers are associated with said one or more ranging codes, and wherein each of said one or more ranging codes is associated with a ranging CPE from among one or more ranging CPEs associated with said OFDMA system; and
      determining an inverse fast Fourier transform of said obtained product for obtaining a correlation output;
   comparing peak of said obtained correlation output with a threshold value;
   and
   detecting one of: a presence of said ranging CPE associated with a ranging code, in said extracted uniformly spaced subcarriers upon said peak of said correlation output exceeding said threshold value and an absence of said ranging CPE associated with said ranging code in said extracted uniformly spaced subcarriers upon said peak of said correlation output being within or equal to said threshold value.

21. The OFDMA system of claim 19, wherein said at least one processor is further configured to:
   performing said frequency domain correlation of ranging data received on said stored plurality of subcarriers by:
      multiplying said ranging subcarriers within said stored subcarriers with a conjugate of a ranging code associated with one or more ranging subcarriers for obtaining a product, while maintaining relative positions of said ranging subcarriers; and performing an inverse fast Fourier transform of said product for obtaining a correlation output; and computing a delay for said ranging CPE based on a position of a peak of said correlation output.

22. The OFDMA system of claim 19, wherein steps of said detecting and said performing delay estimation are repeated iteratively for each of said one or more ranging codes.

23. The OFDMA system of claim 19, wherein said processor is further configured to perform prior to demodulating:

extracting an OFDM symbol devoid of a phase discontinuity from said received OFDM symbol; and cyclically shifting said received OFDM symbol to compensate for a shift introduced by said CPE in said OFDM symbol before transmission from said CPE.

24. A method of subcarrier allocation at a ranging CPE transmitter, said method comprising:

determining a total number of subcarriers, number of subcarriers in a used band, a delay spread to be supported in terms of number of samples, a required ratio of highest amplitude to a second highest amplitude of the ranging signal in time domain (K);

selecting a subcarrier spacing based on a rounded value of ratio of said determined total number of subcarriers and said determined delay spread to be supported in terms of number of samples, wherein said subcarrier spacing is selected based on one of: a divisor of said total number of subcarriers nearest to said ratio or based on said ratio;

selecting a number of uniformly spaced subcarriers to be one of i) an integer nearest to and less than a ratio of said number of used subcarriers and said selected spacing or ii) a prime number nearest to and less than said ratio of said number of used subcarriers and said selected spacing;

selecting an offset of a first uniformly spaced subcarrier from a first used subcarrier to be between 0 and remainder of division of said number of used subcarriers and said selected number of uniformly spaced subcarriers;

selecting a number of randomly spaced subcarriers equivalent to a rounded value of product of (K−1) and said selected number of uniformly spaced subcarriers; and selecting positions of said randomly spaced subcarriers based on a pseudorandom sequence.

25. The method of claim 24, wherein said ranging data is modulated on said selected ranging subcarriers, using at least one of a Zadoff-Chu sequence or a code division multiple access (CDMA) code at said CPE.

* * * * *